US012609892B2

(12) United States Patent
Peng et al.

(10) Patent No.: US 12,609,892 B2
(45) Date of Patent: Apr. 21, 2026

(54) PACKET PROCESSING METHOD AND APPARATUS, DEVICE, AND SYSTEM

(71) Applicant: HUAWEI TECHNOLOGIES CO., LTD., Shenzhen (CN)

(72) Inventors: Shuping Peng, Beijing (CN); Cheng Li, Beijing (CN); Xuesong Geng, Beijing (CN); Zhenbin Li, Beijing (CN); Lei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 831 days.

(21) Appl. No.: 17/471,409

(22) Filed: Sep. 10, 2021

(65) Prior Publication Data

US 2021/0409315 A1 Dec. 30, 2021

Related U.S. Application Data

(63) Continuation of application No. PCT/CN2020/078799, filed on Mar. 11, 2020.

(30) Foreign Application Priority Data

Mar. 11, 2019 (CN) .......................... 201910181016.X

(51) Int. Cl.
*H04L 45/302* (2022.01)
*H04L 45/74* (2022.01)

(52) U.S. Cl.
CPC ............ *H04L 45/306* (2013.01); *H04L 45/74* (2013.01)

(58) Field of Classification Search
CPC ............... H04L 45/306; H04L 12/4633; H04L 2101/659; H04L 45/04; H04L 45/22;
(Continued)

(56) References Cited

U.S. PATENT DOCUMENTS 9,419,887 B1 8/2016 Kabbani et al.
2007/0133503 A1* 6/2007 Boustead ............ H04L 12/4633
370/351
(Continued)

FOREIGN PATENT DOCUMENTS

CN 1601961 A 3/2005
CN 101789904 A 7/2010
(Continued)

OTHER PUBLICATIONS

IEEE P802.1Qcc/D1.6, Jul. 18, 2017, Draft Standard for Local and metropolitan area networks—Bridges and Bridged Networks Amendment: Stream Reservation Protocol (SRP) Enhancements and Performance Improvements Prepared by the Time-Sensitive Networking Task Group of IEEE 802.1 of the LAN/MAN Standards Committee of the IEEE Computer Society, total 218 pages.
(Continued)

*Primary Examiner* — Awet Haile

(57) ABSTRACT

An ingress node obtains a packet, and feature information of an application program corresponding to the packet. The feature information of the application program includes at least one of the following information: identification information and network performance requirement information of the application program. The identification information is used to identify the application program. The ingress node determines the path between the ingress node and the egress node based on the feature information of the application program and a mapping relationship between the feature information of the application program and the path between the ingress node and the egress node. The ingress mode forwards the packet through the path between the ingress node and the egress node.

20 Claims, 5 Drawing Sheets

(58) Field of Classification Search

CPC ......... H04L 45/34; H04L 45/50; H04L 45/54; H04L 45/64; H04L 45/745; H04L 47/125; H04L 67/1004; H04L 67/1023; H04L 69/22; H04L 45/74; H04L 47/248

See application file for complete search history.

(56) References Cited

U.S. PATENT DOCUMENTS

| | | | |
|---|---|---|---|
| 2016/0080251 | A1 | 3/2016 | Ramachandran et al. |
| 2016/0261562 | A1* | 9/2016 | Short .................... H04L 63/10 |
| 2016/0360352 | A1* | 12/2016 | Khan .................... H04W 4/80 |
| 2017/0041246 | A1 | 2/2017 | Maino et al. |
| 2017/0244631 | A1 | 8/2017 | Guichard et al. |
| 2018/0167450 | A1* | 6/2018 | Cherukuri ........... H04L 67/1031 |
| 2018/0219783 | A1* | 8/2018 | Pfister ................ H04L 67/1027 |
| 2018/0375766 | A1 | 12/2018 | Filsfils et al. |
| 2019/0028384 | A1* | 1/2019 | Penno ................... H04L 45/306 |
| 2020/0084153 | A1* | 3/2020 | Ma .......................... H04L 43/16 |

FOREIGN PATENT DOCUMENTS

| | | | |
|---|---|---|---|
| CN | 101924756 | A | 12/2010 |
| CN | 102006242 | A | 4/2011 |
| CN | 102158404 | A | 8/2011 |
| CN | 102447980 | A | 5/2012 |
| CN | 102647341 | A | 8/2012 |
| CN | 103650436 | A | 3/2014 |
| CN | 105049353 | A | 11/2015 |
| CN | 105117278 | A | 12/2015 |
| CN | 105471748 | A | 4/2016 |
| CN | 105634979 | A | 6/2016 |
| CN | 105915453 | A | 8/2016 |
| CN | 106100990 | A | 11/2016 |
| CN | 107888490 | A | 4/2018 |
| CN | 104995891 | B | 12/2018 |
| IN | 20150637614 | | 1/2016 |
| JP | H1127316 | A | 1/1999 |
| JP | 2004260499 | A | 9/2004 |
| JP | 2004529533 | A | 9/2004 |
| JP | 2007060494 | A | 3/2007 |
| JP | 2007282142 | A | 10/2007 |
| JP | 2008011536 | A | 1/2008 |
| JP | 2008263559 | A | 10/2008 |
| JP | 2012138725 | A | 7/2012 |
| JP | 2015023453 | A | 2/2015 |
| JP | 2016149716 | A | 8/2016 |
| JP | 2017017477 | A | 1/2017 |
| JP | 2021530908 | A | 11/2021 |
| WO | 2017147016 | A1 | 8/2017 |

OTHER PUBLICATIONS

International Search Report and Written Opinion issued in PCT/CN2020/078799, dated May 29, 2020, 10 pages.

Extended European Search Report issued in EP20769583.4, dated Dec. 7, 2021, 11 pages.

Office Action issued in CN201910181016.X, dated Mar. 30, 2021, 17 pages.

Japanese Office Action issued in Japanese Application No. 2021-541641 dated Aug. 1, 2022 (13 pages).

Yonghao Sun et al, Mobility Support in Multi-Path TCP, 2011 IEEE, total 5 pages.

Guo Xiao-xue, Research on the Application of Multi-Link and Level-Based Traffic Scheduling Based on Differentiated Services, Computer Engineering and Science, vol. 32, No. 3, 2010, with an English Abstract, total 4 pages.

Chinese Notice of Allowance issued in Chinese Application No. 201910181016.X dated Feb. 7, 2022 (5 pages).

Japanese Notice of Allowance issued in JP Application No. 2021-541641 dated Jan. 23, 2023.

\* cited by examiner

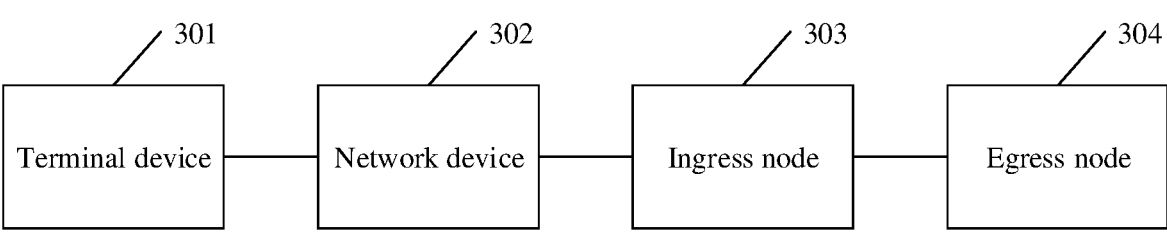

```
        301                    302                    303                    304
   ┌──────────────┐    ┌──────────────┐    ┌──────────────┐    ┌──────────────┐
   │Terminal device│───│Network device │───│ Ingress node │───│ Egress node  │
   └──────────────┘    └──────────────┘    └──────────────┘    └──────────────┘
```

FIG. 3

```
     301                      302                          303
┌──────────┐          ┌──────────┐               ┌──────────┐
│ Terminal │          │ Network  │               │ Ingress  │
│  device  │          │  device  │               │   node   │
└──────────┘          └──────────┘               └──────────┘
     │          S401        │                          │
     │     Send a packet    │                          │
     │─────────────────────▶│   S402                   │
     │           ┌──────────────────────────────┐      │
     │           │ Receive the packet, and obtain│      │
     │           │ feature information of an     │      │
     │           │ application program           │      │
     │           │ corresponding to the packet   │      │
     │           └──────────────────────────────┘      │
     │                      │         S403             │
     │                      │  Send the packet that    │
     │                      │ carries the feature      │
     │                      │ information of the        │
     │                      │ application program       │
     │                      │─────────────────────────▶│  S404
     │                      │           ┌────────────────────────────┐
     │                      │           │ Receive the packet, and    │
     │                      │           │ extract the feature        │
     │                      │           │ information of the         │
     │                      │           │ application program from   │
     │                      │           │ the packet                 │
     │                      │           └────────────────────────────┘
     │                      │                          │  S405
     │                      │           ┌────────────────────────────────┐
     │                      │           │ Determine a path between the    │
     │                      │           │ ingress node 303 and an egress  │
     │                      │           │ node 304 based on the feature   │
     │                      │           │ information and a mapping       │
     │                      │           │ relationship between the feature│
     │                      │           │ information of the application   │
     │                      │           │ program and the path between the│
     │                      │           │ ingress node 303 and the egress │
     │                      │           │ node 304, and forward the packet│
     │                      │           │ through the path                │
     │                      │           └────────────────────────────────┘
     │                      │                          │
```

PACKET PROCESSING METHOD AND APPARATUS, DEVICE, AND SYSTEM

CROSS-REFERENCE TO RELATED APPLICATIONS

This application is a continuation of International Application No. PCT/CN2020/078799, filed on Mar. 11, 2020, which claims priority to Chinese Patent Application No. 201910181016.X, filed on Mar. 11, 2019, The disclosures of the aforementioned applications are hereby incorporated by reference in their entireties.

TECHNICAL FIELD

This application relates to the communications field, and in particular, to a packet processing method and apparatus, a device, and a system.

BACKGROUND

Traffic scheduling means matching a packet sent by a terminal device with a proper path to forward the packet. "Proper" means that the path meets a requirement of the packet for network performance. For example, a traffic requirement is a high bandwidth or a low latency. Traffic scheduling enables the packet to be forwarded to some extent based on a user requirement, so as to implement rational allocation of network resources.

However, currently, traffic scheduling is performed based on quintuple information of the packet. The quintuple information includes a source address, a destination address, a transport-layer source port, a transport-layer destination port, and a protocol type of the packet. To be specific, traffic requirements for a path matched by packets with same quintuple information are the same, and a management granularity of traffic scheduling is relatively coarse. Therefore, a technical problem that needs to be resolved currently is how to implement refined management on network resources and improve allocation rationality of the network resources during traffic scheduling.

SUMMARY

Embodiments of this application provide a packet processing method and apparatus, a device, and a system, to implement refined management on network resources and improve allocation rationality of the network resources.

According to a first aspect, this application provides a packet processing method. The method may be applied to a network system, and the network system includes an ingress node and an egress node. The ingress node is a first node on a path used to forward a packet from an application program, and the ingress node may be a device, for example, a router (router) or a switch (switch). The egress node is a last node on the path used to forward the packet from the application program, and the egress node may be a device, for example, a router (router) or a switch (switch). The path may be various types of tunnels, including a traffic engineering (traffic engineer, TE) tunnel or a segment routing (segment routing, SR) policy (policy). The packet reaches a destination node through the path between the ingress node and the egress node. The packet processing method may include the following steps. First, the ingress node obtains the packet, and obtains feature information of the application program corresponding to the packet. The feature information of the application program includes at least one piece of the following information: identification information and network performance requirement information of the application program. The identification information is used to identify the application program. "Identify" in "identify the application program" may mean uniquely identifying an application program, or may mean identifying a type of application program. The network performance requirement information of the application program may be represented as one or more pieces of information such as bandwidth (bandwidth) information, latency (latency) information, latency jitter (jitter) information, packet loss (packet loss) information, reliability (reliability) information, and security (security) information. Second, the ingress node determines the path between the ingress node and the egress node based on the feature information of the application program. Generally, the ingress node determines the path between the ingress node and the egress node based on the feature information of the application program and a mapping relationship between the feature information of the application program and the path between the ingress node and the egress node. Finally, the ingress node forwards the packet through the path between the ingress node and the egress node.

Conventionally, a path meeting a traffic requirement is matched based on quintuple information (an IP destination address, an IP source address, a transport-layer source port, a transport-layer destination port, and a protocol type) of a packet. To be specific, packets with same quintuple information match a same path. However, there may be many packets with the same quintuple, and different packets may have different traffic requirements for the path. Therefore, a management granularity of a conventional traffic scheduling solution performed based on quintuple information is relatively coarse, and allocation rationality of network resources is poor. The packets with same quintuple may include packets of a plurality of application programs. Therefore, in this application, traffic scheduling based on an application program level is performed to match a path corresponding to network performance for packets from different application programs. Compared with a conventional solution, a management granularity of a traffic scheduling solution is finer. This implements refined management on network resources and improves allocation rationality of the network resources.

In a possible implementation, if the packet is an internet protocol version 6 (Internet Protocol version 6, IPv6) packet, the feature information of the application program is carried in an IPv6 extension header or a destination address of the IPv6 packet. The feature information of the application program is encapsulated into the IPv6 extension header of the IPv6 packet, so that various advantages of the IPv6 extension header are conveniently utilized. For example, a format of a value in a TLV field may be flexibly set, a network device and the ingress node may directly read the feature information, and a network node on the path from the ingress node to the egress node may also read the information. In addition, the feature information of the application program is encapsulated into the destination address of the IPv6 packet, so that the ingress node can efficiently and quickly obtain the feature information that is of the application program and that is in the packet.

In a possible implementation, the IPv6 extension header of the IPv6 packet includes at least one of the following: the type-length-value (type-length-value, TLV) field in the IPv6 extension header and a segment identifier (segment identifier, SID) in a segment routing header (segment routing header, SRH). The feature information of the application program is encapsulated by using the segment identifier of the segment routing header, so that the information can be directly extracted and put into the destination address of the IPv6 packet, and the ingress node efficiently and quickly obtains the feature information that is of the application program and that is in the packet.

In a possible implementation, the format of the value in the TLV field in the IPv6 extension header may be a segment identifier format. To enable the ingress node to extract the feature information of the application program from the TLV field in the IPv6 extension header, the ingress node may learn of the format of the value in the TLV field in the IPv6 extension header in a manner of notification through a protocol, for example, the segment identifier format, and read the feature information of the application program based on the format.

In a possible implementation, the TLV field in the IPv6 extension header includes at least one of the following: a hop-by-hop option (hop-by-hop option) TLV field, a destination option (destination option) TLV field, and a TLV field in the SRH.

In addition, there may be the following three possible implementations of obtaining the feature information of the application program corresponding to the packet.

In a possible implementation, the feature information of the application program is carried in the packet.

In this case, the obtaining feature information of the application program corresponding to the packet includes: extracting, from the packet, the feature information of the application program corresponding to the packet. In this implementation, a network can directly perceive the feature information of the application program, and efficiency of obtaining the feature information is relatively high.

In another possible implementation, the obtaining feature information of the application program corresponding to the packet includes: parsing the packet to obtain the feature information of the application program corresponding to the packet. In this implementation, the packet does not carry the feature information of the application program, but needs to be obtained by parsing the packet. An advantage is that the existing packet does not need to be modified.

In still another possible implementation, the packet may carry service information corresponding to the application program, and the service information is information about a service to which the application program belongs.

In this case, the obtaining feature information of the application program corresponding to the packet includes: determining, based on the service information, the feature information of the application program corresponding to the packet. In some application scenarios, the packet carries the service information. Therefore, the original packet does not need to be modified when the feature information of the application program is determined based on the service information.

Certainly, the foregoing three possible implementation solutions do not constitute a limitation on the technical solutions of this application, and a person skilled in the art may design the technical solutions based on an actual case.

In addition, in a possible implementation, if the feature information of the application program is the network performance requirement information of the application program, that the ingress node obtains the network performance requirement information of the application program may include: The ingress node obtains the identification information of the application program based on the packet. The ingress node determines the network performance requirement information of the application program based on the identification information. For an implementation in which the ingress node obtains the identification information of the application program based on the packet, refer to the foregoing implementations of obtaining the feature information of the application program. Details are not described herein again. A matched path between the ingress node and the egress node may be obtained based on the network performance requirement information of the application program. This implements traffic scheduling based on the application program level and improves allocation rationality of the network resources.

In a possible implementation, the feature information of the application program further includes a user identifier corresponding to the application program, and the user identifier is used to identify a user corresponding to the application program. A specific user corresponding to the packet may be identified by adding the user identifier to the feature information of the application program, so that the path between the ingress node and the egress node is subsequently determined by combining the user identifier with the identification information of the application program and/or the network performance requirement information of the application program. This implements more refined management on the network resources and improves allocation pertinence of the network resources.

In a possible implementation, the method further includes: The ingress node stores the mapping relationship between the feature information of the application program and the path between the ingress node and the egress node. In this way, the ingress node may determine the path between the ingress node and the egress node based on the feature information of the application program corresponding to the packet and the mapping relationship.

In conclusion, the mapping relationship between the feature information of the application program and the path between the ingress node and the egress node includes one of the following:

a mapping relationship between the identification information of the application program and the path between the ingress node and the egress node; a mapping relationship between the network performance requirement information of the application program and the path between the ingress node and the egress node; a mapping relationship between the identification information of the application program, the network performance requirement information of the application program, and the path between the ingress node and the egress node; a mapping relationship between the user identifier, the identification information of the application program, and the path between the ingress node and the egress node; a mapping relationship between the user identifier, the network performance requirement information of the application program, and the path between the ingress node and the egress node; or a mapping relationship between the user identifier, the identification information of the application program, the network performance requirement information of the application program, and the path between the ingress node and the egress node.

In a possible implementation, that the ingress node determines the path between the ingress node and the egress node based on the feature information of the application program and a mapping relationship between the feature information of the application program and the path between the ingress node and the egress node includes: The ingress node selects, based on the feature information of the application program and the mapping relationship between the feature information of the application program and the path between the ingress node and the egress node, a path that matches the feature information of the application program. Alternatively, the ingress node creates a path to the egress node when the ingress node does not find a path that matches the feature information of the application program. In other words, regardless of whether the ingress node stores the mapping relationship matching the feature information of the application program, the corresponding path between the ingress node and the egress node can be determined.

In a possible implementation, there may be two possible implementations in which the ingress node may create the path to the egress node.

In a possible implementation, the ingress node creates, based on obtained topology information of the network system, a path corresponding to the feature information of the application program. This manner is applicable to an ingress node that has a path computation function.

In the other possible implementation, the ingress node sends a path obtaining request to a controller, where the path obtaining request carries the feature information of the application program. The controller generates, based on the path obtaining request, a path corresponding to the feature information of the application program. The ingress node receives the path that is generated by the controller based on the path obtaining request and that corresponds to the feature information of the application program. This implementation is applicable to an ingress node that does not have the path computation function.

The foregoing possible implementation solutions do not constitute a limitation on the technical solutions of this application, and a person skilled in the art may design the technical solutions based on specific implementations.

Further, after creating the path to the egress node, the ingress node may add a correspondence between the created path and the feature information of the application program to the mapping relationship between the feature information of the application program and the path between the ingress node and the egress node, so that next time, the ingress node directly guides packet forwarding based on the created mapping relationship instead of recalculating the path.

In an actual application, traffic of the application program may change with time. Therefore, the corresponding path between the ingress node and the egress node should also change accordingly to adapt to changed traffic of the application program. Therefore, in a possible implementation, the method further includes: The ingress node analyzes the traffic of the application program identified by the identification information of the application program to obtain an analysis result. The ingress node adjusts, based on the analysis result, the path that is between the ingress node and the egress node and that corresponds to the packet of the application program.

In addition, an interface on which the ingress node is connected to a next-hop node on the path may correspond to one or more queues, and different queues may support different network performance. To ensure that corresponding network performance can be enjoyed when the packet is sent from the ingress node, in a possible implementation, that the ingress node forwards the packet through the path between the ingress node and the egress node includes: The ingress node determines, based on the feature information of the application program, a queue corresponding to the feature information of the application program, adds the packet to the queue, and forwards the packet in the queue through the path between the ingress node and the egress node. Network performance of the queue corresponding to the feature information of the application program may match network performance of the corresponding path, to ensure consistency of the network performance in a packet forwarding process.

Correspondingly, the method further includes: The ingress node stores a mapping relationship between the feature information of the application program and the queue. That the ingress node determines, based on the feature information of the application program, a queue corresponding to the feature information of the application program includes: The ingress node determines the queue based on the feature information of the application program and the mapping relationship between the feature information of the application program and the queue.

In conclusion, the mapping relationship between the feature information of the application program and the queue includes one of the following:

a mapping relationship between the identification information of the application program and the queue;
　　a mapping relationship between the network performance requirement information of the application program and the queue;
　　a mapping relationship between the identification information of the application program, the network performance requirement information of the application program, and the queue;
　　a mapping relationship between the user identifier, the identification information of the application program, and the queue;
　　a mapping relationship between the user identifier, the network performance requirement information of the application program, and the queue; or
　　a mapping relationship between the user identifier, the identification information of the application program, the network performance requirement information of the application program, and the queue.

In an actual application, traffic of the application program may change with time. Therefore, the corresponding queue should also change accordingly to adapt to changed traffic of the application program. Therefore, in a possible implementation, the method further includes: The ingress node analyzes the traffic of the application program identified by the identification information of the application program to obtain an analysis result. The ingress node adjusts, based on the analysis result, the queue to which the packet of the application program is added.

According to a second aspect, this application further provides a packet processing method. The method may be applied to a network system, and the network system includes a network device, an ingress node, and an egress node. The network device may be, for example, a gateway, a network adapter, an access device, a router, or a switch. A packet reaches a destination node through a path between the ingress node and the egress node. The packet processing method includes the following steps. First, the network device obtains the packet, and obtains feature information of an application program corresponding to the packet. The feature information of the application program includes at least one piece of the following information: feature information and network performance requirement information of the application program. The identification information is used to identify the application program. For specific descriptions of the feature information of the application program, refer to the foregoing descriptions. Details are not described herein again. Second, the network device sends, to the ingress node, the packet that carries the feature information of the application program. The feature information of the application program is used by the ingress node to determine the path from the ingress node to the egress node, so as to forward the packet. The network device sends, to the ingress node, the packet that carries the feature information of the application program, so that the ingress node can determine the corresponding path between the ingress node and the egress node based on the feature information of the application program. This implements traffic scheduling based on an application program level and improves allocation rationality of network resources.

In a possible implementation, if the packet is an internet protocol version 6 IPv6 packet, the feature information of the application program is carried in an IPv6 extension header or a destination address of the IPv6 packet.

In a possible implementation, the IPv6 extension header of the IPv6 packet includes at least one of the following: a type-length-value TLV field in the IPv6 extension header and/or a segment identifier SID in a segment routing header SRH.

In a possible implementation, the TLV field in the IPv6 extension header includes at least one of the following: a hop-by-hop option TLV field, a destination option TLV field, and a TLV field in the SRH.

In a possible implementation, the packet obtained by the network device is an IPv6 packet, and the TLV field in the IPv6 extension header of the IPv6 packet carries the feature information of the application program in a segment identifier format. Correspondingly, the network device obtains feature information of an application program corresponding to the packet by extracting the feature information of the application program from the IPv6 extension header. The network device sends the packet that carries the feature information of the application program to the ingress node by sending the destination address that is of the IPv6 packet and that carries the feature information of the application program to the ingress node. Because extracting the information from the destination address is faster than extracting the information from the IPv6 extension header, efficiency of extracting the feature information of the application program by the ingress node is increased.

In a possible implementation, there may be the following three possible implementations in which the network device obtains the feature information of the application program corresponding to the packet.

In a possible implementation, the network device obtains feature information of an application program corresponding to the packet by performing operations including parsing the packet to obtain the feature information of the application program. In this implementation, the packet does not carry the feature information of the application program, but needs to be obtained by parsing the packet. An advantage is that the existing packet does not need to be modified.

In another possible implementation, if the feature information that is of the application program and that is carried in the packet sent by the network device to the ingress node includes the network performance requirement information of the application program, and the packet obtained by the network device includes the identification information of the application program, the network device obtains feature information of an application program corresponding to the packet by performing operations including extracting, from the packet, the identification information of the application program corresponding to the packet. The network device determines the network performance requirement information of the application program based on the identification information. In this implementation, a network can directly perceive the feature information of the application program, and efficiency of obtaining the feature information is relatively high.

In still another possible implementation, if the packet obtained by the network device includes service information of the application program, and the service information is information about a service to which the application program belongs, the network device obtains feature information of an application program corresponding to the packet by performing operations including determining, based on the service information of the application program, the feature information corresponding to the application program. In some application scenarios, the packet carries the service information. Therefore, the original packet does not need to be modified when the feature information of the application program is determined based on the service information.

The foregoing three possible implementation solutions do not constitute a limitation on the technical solutions of this application, and a person skilled in the art may design the technical solutions based on a specific implementation.

In a possible implementation, the feature information of the application program further includes a user identifier of the application program. A specific user corresponding to the packet may be identified by adding the user identifier to the feature information of the application program, to facilitate subsequent analysis.

According to a third aspect, this application further provides a packet processing method. The method is applied to a network system, and the network system includes an ingress node and an egress node. The ingress node receives a packet from a terminal device, and the packet reaches a destination node through a path between the ingress node and the egress node. The method includes the following steps. First, the terminal device obtains feature information of an application program. The feature information of the application program includes at least one of the following information: identification information and network performance requirement information of the application program. The identification information is used to identify the application program. Second, the terminal device generates the packet corresponding to the application program. The packet carries the feature information of the application program, and the feature information of the application program is used by the ingress node to determine the path from the ingress node to the egress node, so as to forward the packet to the destination node. Finally, the terminal device sends the packet corresponding to the application program to the destination node by using the network system. In this embodiment of this application, because the packet generated by the terminal device carries the feature information of the application program, and the feature information of the application program is used by the ingress node to determine the path from the ingress node to the egress node, so as to forward the packet to the destination node. It can be learned that compared with a conventional technical solution in which a path meeting a traffic requirement is matched based on quintuple information, in this embodiment of this application, a management granularity of a traffic scheduling solution based on an application program level is finer, and allocation rationality of network resources is improved.

In a possible implementation, if the packet is an internet protocol version 6 IPv6 packet, the feature information of the application program is carried in an IPv6 extension header or a destination address of the IPv6 packet.

In a possible implementation, the IPv6 extension header of the IPv6 packet includes at least one of the following: a type-length-value TLV field in the IPv6 extension header and/or a segment identifier SID in a segment routing header SRH.

In a possible implementation, the TLV field in the IPv6 extension header includes at least one of the following: a hop-by-hop option TLV field, a destination option TLV field, and a TLV field in the SRH.

In a possible implementation, a format of a value in the TLV field in the IPv6 extension header is a segment identifier format.

According to a fourth aspect, a packet processing apparatus is provided. The apparatus is used in a network system, and the network system includes an ingress node and an egress node. A packet reaches a destination node through a path between the ingress node and the egress node. The ingress node is the packet processing apparatus. The packet processing apparatus includes: an obtaining unit (packet receiver), configured to receive the packet, and obtain feature information of an application program corresponding to the packet, where the feature information of the application program includes at least one piece of the following information: identification information and network performance requirement information of the application program, and the identification information is used to identify the application program; a path determiner, configured to determine the path between the ingress node and the egress node based on the feature information of the application program and a mapping relationship between the feature information of the application program and the path between the ingress node and the egress node; and a packet forwarder, configured to forward the packet through the path between the ingress node and the egress node.

In a possible implementation, if the packet is an internet protocol version 6 IPv6 packet, the feature information of the application program is carried in an IPv6 extension header or a destination address of the IPv6 packet.

In a possible implementation, the IPv6 extension header of the IPv6 packet includes at least one of the following: a type-length-value TLV field in the IPv6 extension header and a segment identifier SID in a segment routing header SRH.

In a possible implementation, the TLV field in the IPv6 extension header includes at least one of the following: a hop-by-hop option TLV field, a destination option TLV field, and a TLV field in the SRH.

In a possible implementation, the feature information of the application program is carried in the packet; and the obtaining feature information of an application program corresponding to the packet includes: extracting, from the packet, the feature information of the application program corresponding to the packet.

In a possible implementation, the obtaining feature information of an application program corresponding to the packet includes: parsing the packet to obtain the feature information of the application program corresponding to the packet.

In a possible implementation, if the packet carries service information corresponding to the application program, and the service information is information about a service to which the application program belongs, the obtaining feature information of an application program corresponding to the packet includes:

determining, based on the service information, the feature information of the application program corresponding to the packet.

In a possible implementation, if the feature information of the application program includes the network performance requirement information of the application program, obtaining the network performance requirement information of the application program includes: obtaining the identification information of the application program based on the packet; and determining the network performance requirement information of the application program based on the identification information.

In a possible implementation, the feature information of the application program further includes a user identifier corresponding to the application program, and the user identifier is used to identify a user corresponding to the application program.

In a possible implementation, the apparatus further includes: a first memory storage, configured to store the mapping relationship between the feature information of the application program and the path between the ingress node and the egress node; and the mapping relationship between the feature information of the application program and the path between the ingress node and the egress node includes: a mapping relationship between the identification information of the application program and the path between the ingress node and the egress node; a mapping relationship between the network performance requirement information of the application program and the path between the ingress node and the egress node; a mapping relationship between the identification information of the application program, the network performance requirement information of the application program, and the path between the ingress node and the egress node; a mapping relationship between the user identifier, the identification information of the application program, and the path between the ingress node and the egress node; a mapping relationship between the user identifier, the network performance requirement information of the application program, and the path between the ingress node and the egress node; or a mapping relationship between the user identifier, the identification information of the application program, the network performance requirement information of the application program, and the path between the ingress node and the egress node.

In a possible implementation, the path determiner or router or switch is configured to select, based on the feature information of the application program and the mapping relationship between the feature information of the application program and the path between the ingress node and the egress node, a path that matches the feature information of the application program; or create, by the ingress node, a path to the egress node when no path that matches the feature information of the application program is found.

In a possible implementation, the packet forwarder is configured to determine, based on the feature information of the application program, a queue corresponding to the feature information of the application program, add the packet to the queue, and forward the packet in the queue through the path between the ingress node and the egress node.

In a possible implementation, the apparatus further includes: a second memory storage, configured to store a mapping relationship between the feature information of the application program and the queue; and a queue determiner, configured to determine the queue based on the feature information of the application program and the mapping relationship between the feature information of the application program and the queue.

In a possible implementation, the mapping relationship between the feature information of the application program and the queue includes: a mapping relationship between the identification information of the application program and the queue; a mapping relationship between the network performance requirement information and the queue; a mapping relationship between the identification information of the application program, the network performance requirement information of the application program, and the queue; a mapping relationship between the user identifier, the identification information of the application program, and the queue; a mapping relationship between the user identifier, the network performance requirement information of the application program, and the queue; or a mapping relationship between the user identifier, the identification information of the application program, the network performance requirement information of the application program, and the queue.

According to a fifth aspect, this application further provides a packet processing apparatus. The apparatus is used in a network system, and the network system includes a network device, an ingress node, and an egress node. A packet reaches a destination node through a path between the ingress node and the egress node. The network device is the packet processing apparatus. The packet processing apparatus includes: an obtaining unit (packet receiver), configured to receive the packet, and obtain feature information of an application program corresponding to the packet, where the feature information of the application program includes at least one piece of the following information: feature information and network performance requirement information of the application program, and the identification information is used to identify the application program; and a sending unit (packet transmitter), configured to send, to the ingress node, the packet that carries the feature information of the application program, where the feature information of the application program is used by the ingress node to determine the path from the ingress node to the egress node, so as to forward the packet.

In a possible implementation, if the packet is an internet protocol version 6 IPv6 packet, the feature information of the application program is carried in an IPv6 extension header or a destination address of the IPv6 packet sent by the network device to the ingress node.

In a possible implementation, the IPv6 extension header of the IPv6 packet includes at least one of the following: a type-length-value TLV field in the IPv6 extension header and/or a segment identifier SID in a segment routing header SRH.

In a possible implementation, the TLV field in the IPv6 extension header includes at least one of the following: a hop-by-hop option TLV field, a destination option TLV field, and a TLV field in the SRH.

In a possible implementation, the TLV field in the IPv6 extension header of the IPv6 packet obtained by the packet receiver carries the feature information of the application program in a segment identifier format; and the obtaining feature information of an application program corresponding to the packet includes: extracting the feature information of the application program from the IPv6 extension header; and the sending the packet that carries the feature information of the application program to the ingress node includes: sending the destination address that is of the IPv6 packet and that carries the feature information of the application program to the ingress node.

In a possible implementation, the obtaining feature information of an application program corresponding to the packet includes: parsing the packet to obtain the feature information of the application program.

In a possible implementation, if the feature information that is of the application program and that is carried in the packet sent by the packet sender to the ingress node includes the network performance requirement information of the application program, and the packet obtained by the packet receiver includes the identification information of the application program, the obtaining feature information of an application program corresponding to the packet includes:

extracting, from the packet, the identification information of the application program corresponding to the packet; and determining the network performance requirement information of the application program based on the identification information.

In a possible implementation, if the packet obtained by the packet receiver includes service information of the application program, and the service information is information about a service to which the application program belongs, the obtaining feature information of an application program corresponding to the packet includes:

determining, based on the service information of the application program, the feature information corresponding to the application program.

In a possible implementation, the feature information of the application program further includes a user identifier corresponding to the application program.

According to a sixth aspect, this application further provides a terminal device. The terminal device is used in a network system, and the network system includes an ingress node and an egress node. The ingress node receives a packet from the terminal device, and the packet reaches a destination node through a path between the ingress node and the egress node. The terminal device includes: a packet receiver, configured to obtain feature information of an application program, where the feature information of the application program includes at least one of the following information: identification information and network performance requirement information of the application program, and the identification information is used to identify the application program; a packet generator, configured to generate the packet corresponding to the application program, where the packet carries the feature information of the application program, and the feature information of the application program is used by the ingress node to determine the path from the ingress node to the egress node, so as to forward the packet to the destination node; and a packet sender, configured to send the packet corresponding to the application program to the destination node by using the network system.

In a possible implementation, if the packet is an internet protocol version 6 IPv6 packet, the feature information of the application program is carried in an IPv6 extension header or a destination address of the IPv6 packet.

In a possible implementation, the IPv6 extension header of the IPv6 packet includes at least one of the following: a type-length-value TLV field in the IPv6 extension header and/or a segment identifier SID in a segment routing header SRH.

In a possible implementation, the TLV field in the IPv6 extension header includes at least one of the following: a hop-by-hop option TLV field, a destination option TLV field, and a TLV field in the SRH.

In a possible implementation, a format of a value in the TLV field in the IPv6 extension header is a segment identifier format.

According to a seventh aspect, this application further provides an ingress node. The ingress node is used in a network system, and the network system includes the ingress node and an egress node. A packet reaches a destination node through a path between the ingress node and the egress node. The ingress node includes a memory and a processor. The memory is configured to store instructions, and the processor is configured to execute the instructions in the memory, to perform the packet processing method performed by the ingress node.

According to an eighth aspect, this application further provides a network device, and the network device includes a memory and a processor. The memory is configured to store instructions, and the processor is configured to execute the instructions in the memory, to perform the packet processing method performed by the network device.

According to a ninth aspect, this application further provides a terminal device, and the terminal device includes a memory and a processor. The memory is configured to store instructions, and the processor is configured to execute the instructions in the memory, to perform the packet processing method performed by the terminal device.

According to a tenth aspect, this application further provides a network system, and the network system includes an ingress node and an egress node. A packet reaches a destination node through a path between the ingress node and the egress node. The ingress node is the packet processing apparatus used as the ingress node.

According to an eleventh aspect, this application further provides a network system, and the network system includes a network device, an ingress node, and an egress node. A packet reaches a destination node through a path between the ingress node and the egress node. The network device is the packet processing apparatus used as the network device.

The ingress node is configured to receive the packet sent by the network device, obtain feature information of an application program corresponding to the packet, determine the path between the ingress node and the egress node based on the feature information of the application program, and forward the packet through the path between the ingress node and the egress node.

According to a twelfth aspect, this application further provides a network system, and the network system includes a terminal device, an ingress node, and an egress node. A packet reaches a destination node through a path between the ingress node and the egress node. The terminal device is the packet processing apparatus used as the terminal device.

The ingress node is configured to receive the packet sent by the network device, obtain feature information of an application program corresponding to the packet, determine the path between the ingress node and the egress node based on the feature information of the application program, and forward the packet through the path between the ingress node and the egress node.

According to a thirteenth aspect, this application further provides a computer-readable storage medium, including instructions. When the instructions are run on a computer, the computer is enabled to perform the method.

According to a fourteenth aspect, this application further provides a chip. The chip is disposed in an ingress node and used in a network system. The network system includes the ingress node and an egress node. A packet reaches a destination node through a path between the ingress node and the egress node. The chip includes a processor and an interface circuit. The interface circuit is configured to receive code instructions and transmit the code instructions to the processor. The processor is configured to run the code instructions to perform the method performed by the ingress node.

According to a fifteenth aspect, this application further provides a chip. The chip is disposed in a network device and used in a network system. The network system includes the network device, an ingress node, and an egress node. A packet reaches a destination node through a path between the ingress node and the egress node. The chip includes a processor and an interface circuit. The interface circuit is configured to receive code instructions and transmit the code instructions to the processor. The processor is configured to run the code instructions to perform the method performed by the network device.

According to a sixteenth aspect, this application further provides a chip. The chip is disposed in a terminal device and used in a network system. The network system includes an ingress node and an egress node. The ingress node receives a packet from the terminal device, and the packet reaches a destination node through a path between the ingress node and the egress node. The chip includes a processor and an interface circuit. The interface circuit is configured to receive code instructions and transmit the code instructions to the processor. The processor is configured to run the code instructions to perform the method performed by the terminal device.

BRIEF DESCRIPTION OF DRAWINGS

FIG. 3 is a structural block diagram of another network system according to an embodiment of this application;

FIG. 4 is a schematic diagram of a packet processing method provided based on the network system shown in FIG. 3 according to an embodiment of this application;

DESCRIPTION OF NON-LIMITING EMBODIMENTS

Embodiments of this application provide a packet processing method and apparatus, a device, and a system, to implement refined management on network resources and improve allocation rationality of the network resources.

Figures 1, 2:
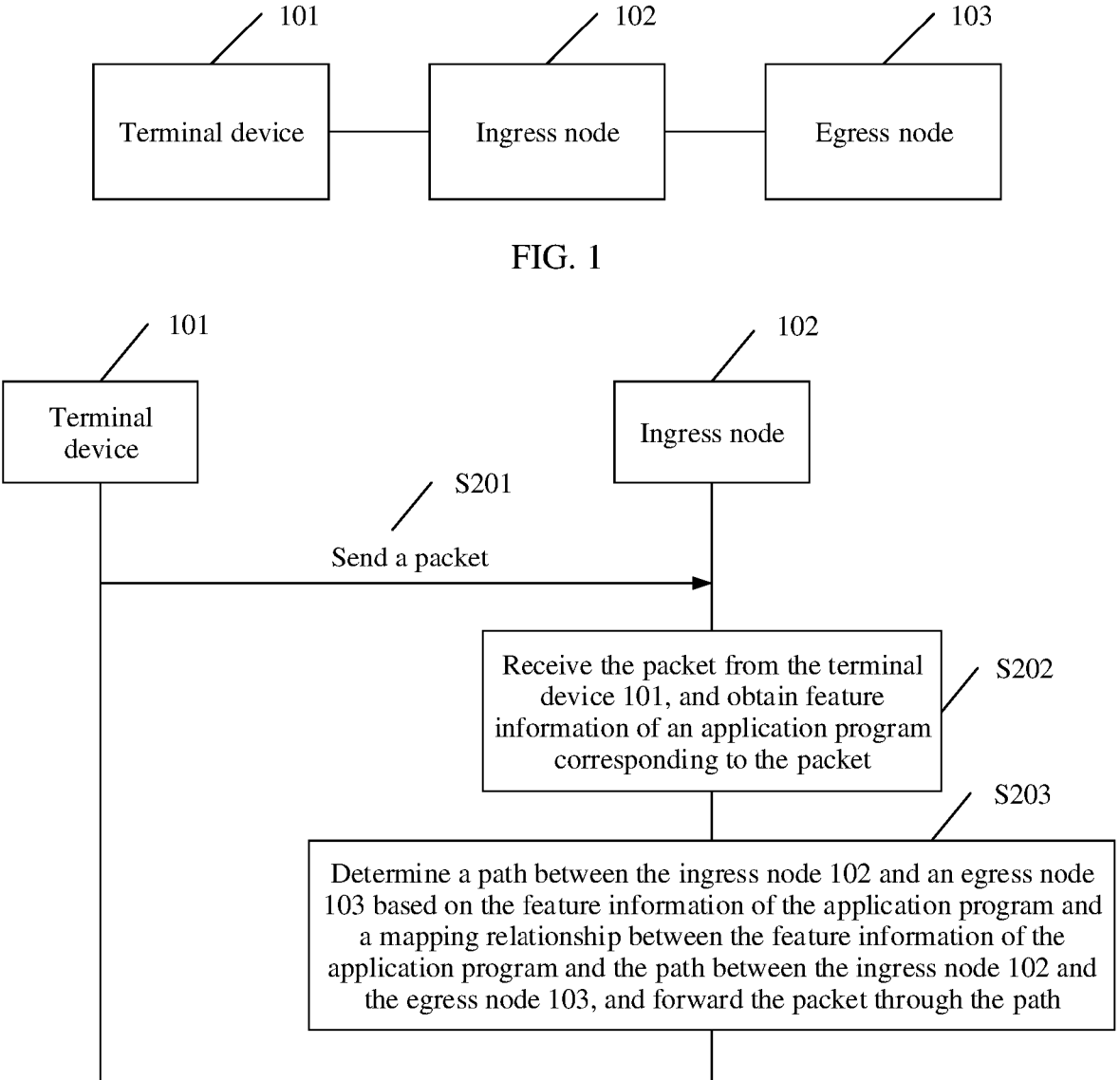
FIG. 1 is a structural block diagram of a network system according to an embodiment of this application.
FIG. 2 is a schematic diagram of a packet processing method provided based on the network system shown in FIG. 1 according to an embodiment of this application.

FIG. 1 shows a network system according to an embodiment of this application. The network system includes a terminal device 101, an ingress node 102, and an egress node 103. The terminal device 101 is connected to the ingress node 102, and the ingress node 102 is connected to the egress node 103. The "connection" may be a direct connection, or may be an indirect connection. Especially, for the connection between the ingress node 102 and the egress node 103, there may be another node between the ingress node 102 and the egress node 103.

The terminal device 101 may be, for example, a mobile phone or a personal computer (personal computer, PC), for example, a tablet personal computer (tablet personal computer, Tablet PC), a notebook computer, an ultra-mobile personal computer, or a personal digital assistant. An application program (application program, APP) is installed on the terminal device 101. The application program, also referred to as application software (application software, APP), is a computer program for completing one or more specific tasks, and usually needs to interact with a user. In the embodiments of this application, the application program may be, for example, an APP related to a game, a video, an email, instant messaging, traffic information, weather forecast, or the like.

The ingress node 102 is a first node on a path used to forward a packet from the application program, and the ingress node 102 may be a device, for example, a router (router) or a switch (switch). The egress node 103 is a last node on the path used to forward the packet from the application program, and the egress node 103 may be a device, for example, a router (router) or a switch (switch). In the embodiments of this application, the packet reaches a destination node through the path between the ingress node 102 and the egress node 103. The destination node and the egress node 103 may be a same node, or may be different nodes. On the path between the ingress node 102 and the egress node 103, there may be or may not be another intermediate node(s) in addition to the ingress node 102 and the egress node 103.

In the embodiments of this application, the path may include a tunnel or a segment routing (segment routing, SR) policy (policy). The tunnel is a path formed by nodes and/or a link from the ingress node to the egress node. The tunnel includes a tunnel, for example, a traffic engineering (traffic engineer, TE) tunnel, and the TE tunnel may be specifically a segment routing (segment routing, SR) network implementation traffic engineering (traffic engineer, TE) tunnel. It may be understood that the TE tunnel may alternatively be a traffic engineering (traffic engineer, TE) tunnel implemented by using another technology. A specific implementation of the tunnel is not limited in this application. One tunnel usually includes one path. The SR policy defines the ingress node, the egress node, and an attribute of the path from the ingress node to the egress node. One SR policy may include one or more paths. If there are a plurality of paths, the plurality of paths are paths supporting same network performance, and the plurality of paths may be used to perform load sharing.

FIG. 2 is a schematic diagram of a packet processing method provided based on the network system shown in FIG. 1 according to an embodiment of this application.

S201: The terminal device 101 sends the packet to the ingress node 102.

In this embodiment of this application, the packet that corresponds to the application program and that is sent by the terminal device 101 to the ingress node 102 may be, for example, an internet protocol version 4 (Internet Protocol version 4, IPv4) packet or an internet protocol version 6 (Internet Protocol version 6, IPv6) packet. If the packet is an IPv6 packet, the packet may be specifically a segment routing version 6 (segment routing version 6, SRv6) packet in IPv6 packets.

The packet that corresponds to the application program and that is sent by the terminal device 101 to the ingress node 102 may carry feature information of the application program, or may not carry feature information of the application program. When the feature information of the application program needs to be carried, to reduce a risk of information leakage, the terminal device 101 may encrypt the feature information of the application program before carrying the feature information. Correspondingly, after extracting the feature information of the application program from the packet, the ingress node 102 decrypts the feature information, and then performs a subsequent action.

In this embodiment of this application, the feature information of the application program includes at least one piece of the following information: identification information and network performance requirement information of the application program. It should be noted that "include" may mean direct inclusion or indirect inclusion. Direct inclusion means that the feature information of the application program includes at least the identification information of the application program and/or the network performance requirement information of the application program. Indirect inclusion means that the feature information of the application program may include at least one index, and the index is used to indicate the identification information of the application program and/or the network performance requirement information of the application program. For example, the identification information of the application program and/or the network performance requirement information of the application program usually includes a relatively large quantity of bits. Therefore, an index with a relatively small quantity of bits may be used instead to reduce a total length of the packet, and save network transmission resources. For example, an index "001" may be used to indicate identification information of an application program and/or network performance requirement information of the application program, and an index "002" may be used to indicate identification information of another application program and/or network performance requirement information of the another application program. For ease of description, "include" in "the feature information includes" mentioned below has this meaning, and details are not described again in related parts.

The identification information is used to identify the application program. "Identify" in "identify the application program" may mean unique identification. In other words, each application program has different identification information. For example, the identification information is a protocol feature code or an application feature code (attribute code) of the application program. For ease of description, in the following example, the identification information of the application program is represented by an APP ID. In addition, "identify" in "identify the application program" may alternatively mean identifying a type of application program. In other words, the identification information may indicate a type of the application program. Application programs of a same type correspond to same identification information. For example, application programs of a game type correspond to same identification information.

The network performance requirement information of the application program indicates a network performance requirement of one application program or a type of application program for the network system. For example, the network performance requirement information of the application program may be represented as one or more pieces of information such as bandwidth (bandwidth) information, latency (latency) information, latency jitter (jitter) information, packet loss (packet loss) information, reliability (reliability) information, and security (security) information.

The network performance requirement information of the application program may be represented in a form of a specific value (for example, a minimum bandwidth or an upper latency limit) of information, for example, the bandwidth information or the latency information, may be a service level agreement (service level agreement, SLA) that represents information, for example, the bandwidth information or the latency information, or may be a path attribute of a path computation algorithm. The SLA specifies multidimensional network performance requirements. For example, a bandwidth is 150 M, the upper latency limit is 5 ms, and a latency jitter is +/−2 ms. The path attribute may be represented by a color (color). For example, red indicates that the network performance requirement information of the application program is a high bandwidth, and blue indicates that the network performance requirement information of the application program is a low latency. The SLA may also be represented by a color (color). For example, a red SLA indicates a high bandwidth and a low latency, or a blue SLA represents a low bandwidth. It should be noted that, in the embodiments of this application, "high" and "low" are relative terms, and which value is "high" and which value is "low" are determined by a person skilled in the art.

In this embodiment of this application, if the feature information of the application program is carried in the packet and the packet is an IPv6 packet, the feature information of the application program may be carried in an IPv6 extension header (extension header, EH) or a destination address of the IPv6 packet.

The IPv6 extension header of the IPv6 packet includes at least one of the following: a type-length-value (type-length-value, TLV) field in the IPv6 extension header (extension header, EH) and a segment identifier (segment identifier, SID) in a segment routing header (segment routing header, SRH), and/or the like. In other words, the feature information of the application program may be carried in the TLV field of the IPv6 packet. When the IPv6 packet is specifically the SRv6 packet, the feature information of the application program may be carried not only in the TLV field of the SRv6 packet, but also in the SID in the SRH of the SRv6 packet.

A type T in the TLV field defines a type of the TLV. In this embodiment of this application, the type of the TLV is a TLV that carries the feature information of the application program. A length L in the TLV field indicates a length of a value V in the TLV. The value V in the TLV field is the feature information of the application program. The length of the TLV value may be 128 bits.

A format of the TLV value may be, for example, a SID format. The SID format includes a locator (locator) field, a function (function) field, and an argument (argument) field. The argument field is used to store the feature information of the application program. The locator field occupies x bits, and the function field occupies y bits. Assuming that a total length of the TLV value is 128 bits, the field that stores the feature information of the application program occupies 128−x−y bits. Certainly, the TLV field may alternatively include only the feature information of the application program, and does not include other information.

The TLV field in the IPv6 extension header includes at least one of the following: a hop-by-hop option (hop-by-hop option) TLV field, a destination option (destination option) TLV field, a TLV field in the SRH, and the like. In other words, the feature information of the application program may be carried in the hop-by-hop option TLV field and/or the destination option TLV field of the IPv6 packet. When the IPv6 packet is specifically the SRv6 packet, the feature information of the application program may be carried not only in the TLV field of the foregoing type of the SRv6 packet, but also in the SID in the SRH of the SRv6 packet.

When the feature information is carried in the SID in the SRH, a read indicator may be further carried in the function (Function) field in the SID, and the read indicator is used to indicate to read the feature information in the SID.

S202: The ingress node 102 receives the packet from the terminal device 101, and obtains the feature information of the application program corresponding to the packet.

In this embodiment of this application, there may be three implementations in which the ingress node 102 obtains the feature information of the application program corresponding to the packet.

In an implementation, if the packet received by the ingress node 102 from the terminal device 101 carries the feature information of the application program, the ingress node 102 may extract the feature information of the application program from the packet.

Specifically, the ingress node 102 may extract the feature information of the application program in a manner of notification through a protocol, for example, an interior gateway protocol (Interior Gateway Protocol, IGP), a border gateway protocol (Border Gateway Protocol, BGP), or a path computation element communication protocol (Path Computation Element Communication Protocol, PCEP). For example, the feature information of the application program is stored in the TLV field, and a specific format is, for example, the SID format. In this case, a controller may notify, based on the foregoing protocol, the ingress node 102 that a parsed format of the feature information of the application program is the SID format. After the notification, the ingress node 102 may read, based on the SID format, the feature information that is of the application program and that is stored in the TLV field.

In another implementation, the packet received by the ingress node 102 from the terminal device 101 does not carry the feature information of the application program. In this case, the ingress node 102 may parse the packet to obtain the feature information of the application program. A parser is, for example, deep packet inspection (deep packet inspection, DPI).

In still another implementation, the packet received by the ingress node 102 from the terminal device 101 carries service information. The service information is information about a service to which the application program belongs, for example, information about a customer virtual local area network (customer virtual lan, C-VLAN), or information about a service virtual local area network (service virtual lan, S-VLAN).

It should be noted that, if the packet received by the ingress node 102 from the terminal device 101 is an IPv6 packet, any one of the foregoing three methods may be used to obtain the feature information of the application program. If the packet received by the ingress node 102 from the terminal device 101 is an IPv4 packet, the foregoing second method may be used to obtain the feature information of the application program.

The foregoing three possible implementations do not constitute a limitation on the technical solutions of this application, and a person skilled in the art may design the technical solutions based on a specific implementation.

For example, if the feature information that is of the application program corresponding to the packet and that the ingress node 102 needs to obtain is the network performance requirement information of the application program, in addition to obtaining in the foregoing three implementations, the ingress node 102 may first obtain the identification information of the application program based on the packet, and then determine the network performance requirement information that is of the application program and that corresponds to the identification information of the application program based on a pre-stored mapping relationship between the identification information of the application program and the network performance requirement information of the application program. The ingress node 102 may obtain the identification information of the application program based on the packet in the foregoing three implementations.

Table 1 is an example table of a mapping relationship between identification information of an application program and network performance requirement information of the application program.

TABLE 1

| APP ID | APP network performance requirement information |
|---|---|
| Application program 1 ID | Bandwidth > 20 Mbit/s, and latency < 1 ms |
| Application program 2 ID | Bandwidth > 10 Mbit/s |
| Application program 3 ID | Latency jitter +/− 2 ms |

S203: The ingress node 102 determines the path between the ingress node 102 and the egress node 103 based on the feature information of the application program and a mapping relationship between the feature information of the application program and the path between the ingress node 102 and the egress node 103, and forwards the packet through the path between the ingress node 102 and the egress node 103.

In this embodiment of this application, the path between the ingress node 102 and the egress node 103 includes a link between two adjacent nodes from the ingress node 102 to the egress node 103. For example, a packet starts from an ingress node, namely, a node A, and successively passes through a node B, a node C, and a node D, and reaches an egress node, namely, a node E. In this case, a path from the node A to the node E includes a link from the node A to the node B, a link from the node B to the node C, a link from the node C to the node D, and a link from the node D to the node E.

In an actual application, the path between the ingress node 102 and the egress node 103 may be represented by using a segment identifier list (SID list). The segment identifier list includes at least one segment identifier, and one segment identifier is used to identify a link between two adjacent nodes or a node itself.

The segment identifier is used to identify the link between the two adjacent nodes. For example, a SID list corresponding to the path from the node A to the node E includes an SID 1, an SID 2, an SID 3, and an SID 4. The SID 1 is used to identify the link from the node A to the node B, the SID 2 is used to identify the link from the node B to the node C, the SID 3 is used to identify the link from the node C to the node D, and the SID 4 is used to identify the link from the node D to the node E.

The segment identifier is used to identify the node itself. For example, a SID list corresponding to the path from the node A to the node E includes an SID 1', an SID 2', an SID 3', an SID 4', and an SID 5'. The SID 1' is used to identify the node A, the SID 2' is used to identify the node B, the SID 3' is used to identify the node C, the SID 4' is used to identify the node D, and the SID 5' is used to identify the node E.

In this embodiment of this application, the packet starting from the ingress node 102 and reaching a same destination node may correspond to a plurality of paths between the ingress node 102 and the egress node 103. Different paths support different network performance. For example, the network performance supported by the path includes one or more of a bandwidth, a latency, security, and a jitter. Therefore, the ingress node 102 may obtain and store the mapping relationship between the feature information of the application program and the path in advance. After obtaining the packet, the ingress node 102 determines the path between the ingress node 102 and the egress node 103 based on the feature information of the application program corresponding to the packet and the mapping relationship, to forward the packet of the application program through the path. This implements traffic scheduling at an application program level and implements refined management on network resources.

For example, it is assumed that the packet corresponds to a path 1 and a path 2 from the ingress node to the destination node, where the path 1 may meet a high-bandwidth network performance requirement, and the path 2 may meet a low-latency network performance requirement. The ingress node 102 may pre-establish a mapping relationship between feature information of the application program 1 and the path 1, and a mapping relationship between feature information of the application program 2 and the path 2. After obtaining a packet 1 and the feature information of the application program 1 corresponding to the packet 1, the ingress node 102 determines, based on the feature information of the application program 1, that a corresponding path is the path 1. Therefore, the ingress node 102 may forward the packet 1 through the path 1. After obtaining a packet 2 and the feature information of the application program 2 corresponding to the packet 2, the ingress node 102 determines, based on the feature information of the application program 2, that a corresponding path is the path 2. Therefore, the ingress node 102 may forward the packet 2 through the path 2.

As mentioned above, the feature information of the application program may include at least the identification information of the application program and the network performance requirement information of the application program. Therefore, the mapping relationship between the feature information of the application program and the path between the ingress node and the egress node may include: a mapping relationship between the identification information of the application program and the path between the ingress node and the egress node; a mapping relationship between the network performance requirement information of the application program and the path between the ingress node and the egress node; or a mapping relationship between the identification information of the application program, the network performance requirement information of the application program, and the path between the ingress node and the egress node.

For example, refer to Table 2. Table 2 is an example table of a mapping relationship between identification information of an application program and a path between the ingress node and the egress node.

TABLE 2

| APP ID | Path |
|---|---|
| Application program 1 ID | Path 1 |
| Application program 2 ID | Path 2 |
| Application program 3 ID | Path 3 |

The ingress node 102 may establish and store the mapping relationship shown in Table 2, and then determine the corresponding path between the ingress node 102 and the egress node 103 based on the obtained ID of the application program corresponding to the packet.

For another example, refer to Table 3. Table 3 is an example table of a mapping relationship between network performance requirement information of an application program and a path.

TABLE 3

| APP network performance requirement information | Path |
|---|---|
| Bandwidth > 20 Mbit/s, and latency < 1 ms | Path 1 |
| Bandwidth > 10 Mbit/s | Path 2 |
| Jitter | Path 3 |

The ingress node 102 may establish and store the mapping relationship shown in Table 3, and then determine the corresponding path between the ingress node 102 and the egress node 103 based on the network performance requirement information of the application program corresponding to the packet.

Table 4 is an example table of a mapping relationship between identification information of an application program, network performance requirement information of the application program, and a path.

TABLE 4

| APP ID | APP network performance requirement information | Path |
|---|---|---|
| Application program 1 ID | Bandwidth > 20 Mbit/s, and latency < 1 ms | Path 1 |
| Application program 2 ID | Bandwidth > 10 Mbit/s | Path 2 |
| Application program 3 ID | Jitter | Path 3 |

The ingress node 102 may establish and store the mapping relationship shown in Table 4, and then determine the corresponding path between the ingress node 102 and the egress node 103 based on the obtained ID of the application program corresponding to the packet and the obtained network performance requirement information of the application program.

It should be noted that, in the mapping relationship that is between the network performance requirement information of the application program and the path between the ingress node 102 and the egress node 103 and that is stored in the ingress node 102, the network performance requirement information of the application program may have two meanings. One may be reflected as a requirement of the application program for network performance. The other may be reflected as network performance that can be met by the path between the ingress node 102 and the egress node 103, and the network performance matches a network performance requirement that is of the application program and that is obtained based on the packet.

For example, it is assumed that the network performance requirement of the application program is a bandwidth >20 Mbit/s, and bandwidth performance that can be met by a corresponding path between the ingress node 102 and the egress node 103 a bandwidth >15 Mbit/s. In this case, the mapping relationship that is between the network performance requirement information of the application program and the path between the ingress node 102 and the egress node 103 and that is stored in the ingress node 102 may be represented as a mapping relationship between the bandwidth >20 Mbit/s and the path, or may be represented as a mapping relationship between the bandwidth >15 Mbit/s and the path. If the mapping relationship that is between the network performance requirement information of the application program and the path between the ingress node 102 and the egress node 103 and that is stored in the ingress node 102 is represented as the mapping relationship between the bandwidth >15 Mbit/s and the path, when the network performance requirement information, namely, the bandwidth >20 Mbit/s, of the application program is obtained based on the packet, because the bandwidth >20 Mbit/s is in a range of the bandwidth >15 Mbit/s, the mapping relationship between the bandwidth >15 Mbit/s and the path may be matched. A path that matches the network performance requirement information of the application program is further determined.

It may be understood that the destination address of the packet obtained by the ingress node 102 is the same as an address of the destination node corresponding to the path that is between the ingress node 102 and the egress node 103 and that is determined by the ingress node 102.

It should be noted that there may be one or more paths corresponding to the feature information. If there are a plurality of paths, the plurality of paths support the same network performance. In other words, the plurality of paths are redundant paths. In this case, one path may be selected from the plurality of paths to forward the packet, or load sharing may be performed.

It may be understood that, if the feature information that is of the application program corresponding to the packet and that is obtained by the ingress node 102 is the identification information of the application program, and when the mapping relationship that is between the feature information of the application program and the path between the ingress node 102 and the egress node 103 and that is stored in the ingress node 102 is the mapping relationship shown in Table 3, Table 4, or Table 5, the ingress node 102 may obtain the matched network performance requirement information of the application program by searching Table 1 based on the identification information that is of the application program and that is obtained from the packet, and then determine the corresponding path between the ingress node 102 and the egress node 103 according to Table 3, Table 4, or Table 5.

In addition, the mapping relationship that is between the feature information of the application program and the path and that is pre-stored in the ingress node 102 may be a mapping relationship that is between the feature information of the application program and the path and that is generated based on network performance supported by the path after the path is obtained. It may be understood that, if the path is established by the ingress node 102 based on obtained topology information of a network, the ingress node 102 generates the mapping relationship between the feature information of the application program and the path based on the network performance supported by the path. If path information used to establish the path is obtained by the ingress node 102 from the controller, the controller may deliver the mapping relationship between the path and the feature information of the application program to the ingress node 102, and the ingress node stores the mapping relationship. Alternatively, in another implementation, if the controller does not deliver the mapping relationship between the path and the feature information of the application program to the ingress node 102, the ingress node 102 may generate the mapping relationship between the feature information of the application program and the path based on the network performance supported by the path. For a process in which the ingress node 102 communicates with the controller to establish the path, refer to the following specific descriptions.

In another implementation, the mapping relationship that is between the feature information of the application program and the path and that is stored in the ingress node 102 may be dynamically updated. For example, after the ingress node 102 obtains the packet, if no corresponding mapping relationship is found based on the feature information of the application program corresponding to the packet, in other words, no matched path is found, the ingress node 102 may dynamically obtain a path that matches the feature information that is of the application program and that is in the packet, establish a mapping relationship between the path and the feature information of the application program, and store the mapping relationship, for example, add the mapping relationship to an existing mapping relationship for use when the packet is subsequently obtained.

It should be noted that the path that is dynamically obtained by the ingress node 102 and path that matches the feature information of the application program may be generated by the ingress node 102, or may be generated by the controller connected to the ingress node 102. The controller may be, for example, a software-defined networking (software defined network, SDN) controller.

If the path is generated by the ingress node 102, the ingress node 102 may obtain the topology information of the network system, and generate, based on the topology information of the network system, the path corresponding to the feature information. If the path is generated by the controller connected to the ingress node 102, the ingress node 102 may send a path obtaining request to the controller, where the path obtaining request carries the feature information. The path obtaining request may further include other information used for path computation, for example, the destination address of the packet. After receiving the path obtaining request, the controller may obtain the topology information of the network system, the destination address of the packet, and other information used for path computation, generate the path corresponding to the feature information, and deliver the path to the ingress node 102. The ingress node 102 receives the path, and establishes and stores the mapping relationship between the feature information and the path.

In addition, in this embodiment of this application, in addition to the identification information and/or the network performance requirement information of the application program, the feature information may further include a user identifier corresponding to the application program. The user identifier is used to identify a user corresponding to the application program, for example, a user who uses the application program. The user identifier may include information such as a user name of the user.

When the packet sent by the terminal device 101 to the ingress node 102 carries the user identifier in the feature information, if the packet is an IPv6 packet, the user identifier is carried in the TLV field in the IPv6 extension header of the IPv6 packet, and may be specifically carried in the hop-by-hop option (Hop-by-Hop option) TLV field, the destination option (destination option) TLV field, or the like. If the packet is the SRv6 packet, the user identifier may be carried in the TLV field in the SRH of the SRv6 packet or the SID in the SRH of the SRv6 packet in addition to being carried in the hop-by-hop option TLV field, the destination option TLV field, or the like.

Correspondingly, the ingress node 102 may pre-establish a mapping relationship between the user identifier, at least one of the other two pieces of feature information, and the path, and then obtain the corresponding path based on the mapping relationship, the user identifier, and the at least one of the other two pieces of feature information that are obtained based on the packet.

Table 5 is an example table of a mapping relationship between a user identifier, identification information of an application program, network performance requirement information of the application program, and a path.

TABLE 5

| APP ID | APP network performance requirement information | User identifier | Path |
|---|---|---|---|
| Application program 1 ID | Bandwidth > 20 Mbit/s, and latency < 1 ms | User name 1 | Path 1 |
| Application program 2 ID | Bandwidth > 10 Mbit/s | User name 2 | Path 2 |
| Application program 3 ID | Jitter | User name 3 | Path 3 |

Alternatively, when the network performance requirement information of the corresponding application program is determined based on the identification information, the network performance requirement information of the corresponding application program may be determined based on the identification information and the user identifier.

In addition, as mentioned above, in an actual application, the index may be used to indicate the identification information of the application program and/or the network performance requirement information of the application program. In a specific implementation, the index may be further used to indicate the user identifier. That is, the APP ID, the network performance requirement information of the application program, and the user identifier in Table 5 may be replaced with one or more indexes.

Generally, the mapping relationship between the feature information of the application program and the path between the ingress node 102 and the egress node 103 includes one of the following mapping relationship:

a mapping relationship between the identification information of the application program and the path between the ingress node 102 and the egress node 103;

a mapping relationship between the network performance requirement information of the application program and the path between the ingress node 102 and the egress node 103;

a mapping relationship between the identification information of the application program, the network performance requirement information of the application program, and the path between the ingress node 102 and the egress node 103;

a mapping relationship between the user identifier, the identification information of the application program, and the path between the ingress node 102 and the egress node 103;

a mapping relationship between the user identifier, the network performance requirement information of the application program, and the path between the ingress node 102 and the egress node 103; or a mapping relationship between the user identifier, the identification information of the application program, the network performance requirement information of the application program, and the path between the ingress node 102 and the egress node 103.

In conclusion, conventionally, a path meeting a traffic requirement is matched based on quintuple information (an IP destination address, an IP source address, a transport-layer source port, a transport-layer destination port, and a protocol type) of a packet. To be specific, packets with same quintuple information match a same path. However, there may be many packets with same quintuple, and different packets may have different traffic requirements for the path. Therefore, a management granularity of a conventional traffic scheduling solution performed based on quintuple information is relatively coarse, and allocation rationality of network resources is poor. The packets with same quintuple may include packets of a plurality of application programs. Therefore, in this embodiment of this application, traffic scheduling based on an application program level is performed to match a path corresponding to network performance for packets from different application programs. Compared with a conventional solution, a management granularity of a traffic scheduling solution is finer. This implements refined management on network resources and improves allocation rationality of the network resources. For example, when an application program A requires high-bandwidth and low-latency network performance to meet a high-traffic requirement of the application program, a path supporting the network performance may be generated for the application program A, and a packet from the application program A is forwarded through the path supporting the network performance. When traffic of an application program B is relatively small, a relatively low bandwidth may be required. In this case, a path supporting the relatively low bandwidth may be generated for the application program B to forward a packet from the application program B. In this way, network resources can be allocated more rationally.

In the embodiment shown in FIG. 1, the network system includes the terminal device, the ingress node, and the egress node. In another embodiment, the network system may further include a network device.

FIG. 3 is a structural block diagram of another network system according to an embodiment of this application. In FIG. 3, the network system includes a terminal device 301, a network device 302, an ingress node 303, and an egress node 304. The terminal device 301 is connected to the network device 302, the network device 302 is connected to the ingress node 303, and the ingress node 303 is connected to the egress node 304.

The network device 302 may be, for example, a gateway, a network adapter, an access device, a router, or a switch. The access device may include a digital subscriber line access multiplexer (digital subscriber line access multiplexer, DSLAM), an optical network terminal (optical network terminal, ONT), an optical line terminal (optical line terminal, OLT), a customer premises equipment (customer premises equipment, CPE), and the like.

For the terminal device 301, the ingress node 303, and the egress node 304, respectively refer to the foregoing descriptions of the terminal device 101, the ingress node 102, and the egress node 103. Details are not described herein again.

FIG. 4 is a schematic diagram of a packet processing method provided based on the network system shown in FIG. 3.

S401: The terminal device 301 sends a packet to the network device 302.

Content sent by the terminal device in S401 is the same as content sent by the terminal device in S201, and both are packets, but objects to which the terminal device sends the packets are different. In S201, the object to which the terminal device 101 sends the packet is the ingress node 102, while in S401, the object to which the terminal device 301 sends the packet is the network device 302. Therefore, S401 is not described in detail in this embodiment of this application. For related content of the packet, refer to S201.

S402: The network device 302 receives the packet from the terminal device 301, and obtains, based on the packet, feature information of an application program corresponding to the packet.

S402 is basically the same as S202, and only execution platforms of the steps are different. The execution platform in the step S202 is the ingress node 102 while the execution platform in the step S402 is the network device 302. In addition, the packet received by the ingress node 102 in S202 is from the terminal device 101. Similarly, the packet received by the network device 302 in S402 is from the terminal device 301. Therefore, S402 is not described in detail in this embodiment of this application. For related content, refer to S202.

In addition, it should be noted that the three manners of obtaining, based on the packet, the feature information of the application program corresponding to the packet are mentioned above. In the embodiment shown in FIG. 4, if the packet received by the network device 302 from the terminal device 301 is an IPv6 packet, the network device 302 may obtain the feature information of the application program in the last two manners. If the packet received by the network device 302 from the terminal device 301 is an IPv4 packet, the network device 302 may obtain the feature information of the application program in the foregoing second manner, namely, a packet parsing manner.

S403: The network device 302 sends, to the ingress node 303, the packet that carries the feature information of the application program.

In this embodiment of this application, when the packet received by the network device 302 from the terminal device 301 carries the feature information of the application program, and the packet is an IPv6 packet, according to the foregoing descriptions, the feature information of the application program may be carried in an IPv6 extension header of the IPv6 packet. When the feature information of the application program is carried in a TLV field in the IPv6 extension header of the IPv6 packet in a segment identifier format, the network device 302 may extract the feature information that is of the application program and that is carried in the TLV field in the IPv6 extension header in the segment identifier format, and put the feature information in a destination address of the IPv6 packet. In this way, the ingress node 303 may extract the feature information from the destination address when extracting the feature information from the IPv6 packet. Because extracting the information from the destination address is faster than extracting the information from the TLV field in the IPv6 extension header, efficiency of extracting the feature information of the application program by the ingress node 303 is increased. Certainly, when the feature information of the application program is carried in an SID in an SRH of an SRv6 packet in the segment identifier format, the network device 302 may extract the feature information that is of the application program and that is carried in the SID in the segment identifier format, and put the feature information in a destination address of the SRv6 packet.

If the packet received by the network device 302 from the terminal device 301 is an IPv4 packet, the network device 302 may parse the IPv4 packet to obtain the feature information of the application program, then encapsulate the IPv4 packet into an SRv6 packet, and enable the feature information of the application program to be carried in a TLV field of the SRv6 packet or a segment identifier SID in an SRH of the SRv6 packet. The TLV field of the SRv6 packet may include a hop-by-hop option TLV field, a destination option TLV field, and a TLV field in the SRH.

S404: The ingress node 303 receives the packet from the network device 302, and extracts the feature information of the application program from the packet.

Specifically, the ingress node 303 may extract the feature information of the application program from the packet in a manner of notification through a protocol, for example, an interior gateway protocol (Interior Gateway Protocol, IGP), a border gateway protocol (Border Gateway Protocol, BGP), or a path computation element communication protocol (Path Computation Element Communication Protocol, PCEP). Content of the notification through a protocol may be a storage format of the feature information of the application program in the packet, for example, the SID format. The ingress node 303 may extract the feature information of the application program according to the format.

S405: The ingress node 303 determines a path between the ingress node 303 and the egress node 304 based on the feature information and a mapping relationship between the feature information of the application program and the path between the ingress node 303 and the egress node 304, and forwards the packet through the path between the ingress node 303 and the egress node 304.

S405 is basically the same as S203, and details are not described herein again. For related content, refer to the foregoing descriptions.

In conclusion, a difference between the packet processing method shown in FIG. 4 and the packet processing method shown in FIG. 2 lies in that the network device 302 is added to the network system, and the network device 302 shares some functions of the ingress node 303. To be specific, in the packet processing method shown in FIG. 4, the network device 302 obtains, based on the packet, the feature information of the application program corresponding to the packet, while this step is performed by the ingress node 102 in the packet processing method shown in FIG. 2. Therefore, correspondingly, the network device 302 needs to send the feature information of the application program to the ingress node 303.

In addition, as mentioned above, the ingress node 303 in this embodiment may be the same as the ingress node 102 in FIG. 2. In the packet processing method shown in FIG. 2, when the feature information of the application program is the network performance requirement information of the application program, the ingress node 102 may first obtain the identification information of the application program based on the packet, and then determine the network performance requirement information that is of the application program and that corresponds to the identification information of the application program based on the pre-stored mapping relationship between the identification information and the network performance requirement information of the application program. It may be understood that, if the feature information that is of the application program corresponding to the packet and that is obtained by the ingress node 303 is the identification information of the application program, and when the mapping relationship that is between the feature information of the application program and the path between the ingress node 303 and the egress node 304 and that is stored in the ingress node 303 is the foregoing the mapping relationship shown in Table 3, Table 4, or Table 5, the ingress node 303 may obtain the matched network performance requirement information of the application program by searching Table 1 based on the identification information that is of the application program and that is obtained from the packet, and then determines the corresponding path between the ingress node 303 and the egress node 304 according to Table 3, table 4 or Table 5.

Therefore, based on the network system shown in FIG. 3, in another implementation, S402, S403, and S404 may be respectively replaced with S402', S403', and S404'.

S402': The network device 302 receives the packet from the terminal device 301, and obtains the identification information of the application program based on the packet.

A manner in which the network device 302 obtains the identification information of the application program based on the packet is similar to the foregoing three manners in which the ingress node 102 obtains the identification information of the application program, and details are not described herein again.

S403': The network device 302 sends, to the ingress node 303, the packet that carries the identification information of the application program.

S404': The ingress node 303 receives the packet from the network device 302, and determines, based on the identification information that is of the application program and that is in the packet and a mapping relationship that is between the identification information of the application program and the network performance requirement information of the application program and that is stored in the ingress node 303, a network performance requirement corresponding to the identification information.

Based on the network system shown in FIG. 3, in still another implementation, the network device 302 may not process the packet from the terminal device 301, but directly forwards the packet to the ingress node 303. In this case, the steps performed by the ingress node 303 are basically the same as the steps performed by the ingress node 102 in the packet processing method shown in FIG. 2. Therefore, details are not described herein again.

In addition, as mentioned above, the feature information may further include a user identifier. For processing of the user identifier in the packet processing method based on the network system shown in FIG. 3, refer to the foregoing descriptions. Details are not described herein again.

In a specific implementation, in this embodiment of this application, a mapping relationship between the feature information of the application program and a queue may be further pre-established on the ingress node 102 or the ingress node 303. The path that is determined by the ingress node and that is used to forward the packet includes a path between the ingress node and a next-hop node. An interface for connecting the ingress node to the next-hop node may correspond to one or more queues, and different queues may support different network performance. For example, the network performance supported by the queue may include assured forwarding (assured forwarding, AF), expedited forwarding (expedited forwarding, EF), best effort (best effort, BE), or the like. An AF queue can ensure a relatively low loss probability of a packet in the queue when service traffic sent by a network does not exceed a minimum assured bandwidth. An EF queue is used to forward a packet that requires a low latency and occupies a low bandwidth, for example, a voice packet. A BE queue is used to forward a packet that is not applicable to the AF queue and the EF queue.

Network performance supported by a queue corresponding to a same piece of feature information may match network performance supported by a corresponding path, to ensure that the packet can enjoy the corresponding network performance when being sent from the ingress node, not only through the path, but also by using the queue. Therefore, the ingress node may determine the corresponding queue based on the feature information obtained based on the packet and the mapping relationship between the feature information and the queue, add the packet to the queue, and forward the packet through the path corresponding to the feature information.

For example, an interface for connecting an ingress node A and a node B may correspond to two queues, and the two queues are respectively a queue 1 and a queue 2. The queue 1 is an AF queue, and the queue 2 is an EF queue. Network performance corresponding to a path between the ingress node A and the node B is a high bandwidth, for example, bandwidth >20 Mbit/s. Therefore, the node A may add the packet to the queue 1.

It may be understood that when the queue corresponding to the feature information of the application program is determined, the queue may be determined according to another rule in addition to performance supported by the queue. This is not limited in this embodiment of this application, for example, any one of a plurality of queues is selected.

Specifically, the mapping relationship between the feature information of the application program and the queue may include one of the following:

a mapping relationship between the identification information of the application program and the queue;

a mapping relationship between the network performance requirement information of the application program and the queue;

a mapping relationship between the identification information of the application program, the network performance requirement information of the application program, and the queue;

a mapping relationship between the user identifier, the identification information of the application program, and the queue;

a mapping relationship between the user identifier, the network performance requirement information of the application program, and the queue; or a mapping relationship between the user identifier, the identification information of the application program, the network performance requirement information of the application program, and the queue.

For example, refer to Table 6. Table 6 is an example table of a mapping relationship between a user identifier, identification information of an application program, network performance requirement information of the application program, and a queue.

TABLE 6

| APP ID | APP network performance requirement information | User identifier | Queue |
|---|---|---|---|
| Application program 1 ID | Bandwidth > 20 Mbit/s, and latency < 1 ms | User name 1 | Queue 1 |

TABLE 6-continued

| APP ID | APP network performance requirement information | User identifier | Queue |
|---|---|---|---|
| Application program 2 ID | Bandwidth > 10 Mbit/s | User name 2 | Queue 2 |
| Application program 3 ID | Jitter | User name 3 | Queue 3 |

In this embodiment of this application, when traffic of an application program changes, it means that a network performance requirement of the application program also changes. Therefore, a queue to which a packet of the application program is added is adjusted.

Specifically, the ingress node 102 or the ingress node 303 may analyze traffic of the application program identified by the identification information of the application program to obtain an analysis result, and then adjust, based on the analysis result, the queue to which the packet of the application program is added.

When packet traffic is analyzed, to be specific, traffic of a plurality of packets with same identification information of an application program is monitored and analyzed, traffic feature information is extracted, for example, a traffic amount, packet length information, protocol information, port traffic information, or transmission control protocol (Transmission Control Protocol, TCP) flag information, a change of the traffic is analyzed based on the traffic feature information to determine a new network performance requirement of the application program, and then a matched queue is re-determined based on the new network performance requirement.

For example, the ingress node analyzes traffic of a packet of an application program A, and finds that the traffic of the application program A decreases. Assuming that a queue corresponding to the application program A is an AF queue, the ingress node may adjust the queue of the application program A to a BE queue, to rationally allocate transmission resources of the ingress node.

Similarly, the ingress node may further adjust, based on the analysis result of the traffic of the application program, the path that is between the ingress node and the egress node that corresponds to the packet of the application program.

For example, if the traffic of the application increases, the path that is between the ingress node and the egress node and that corresponds to the application program may be adjusted to a path whose bandwidth meets the traffic.

For example, original traffic of the application program is 8 Mbit/s, and a bandwidth that is of the path between the ingress node and the egress node and that is determined based on the feature information of the application program is 10 Mbit/s. When the traffic of the application program becomes 15 Mbit/s, the path between the ingress node and the egress node may be re-determined as a path meeting a bandwidth of 20 Mbit/s.

It should be noted that, a technical means in which the ingress node adjusts, based on the analysis result of the traffic of the application program, the path that is between the ingress node and the egress node and that corresponds to the packet of the application program is applicable to the embodiments shown in FIG. 2 and FIG. 4. Therefore, the ingress node 102 and the ingress node 303 can adjust, based on the analysis result of the traffic of the application program, the path that is between the ingress node and the egress node and that corresponds to the packet of the application program.

Figures 5, 6:
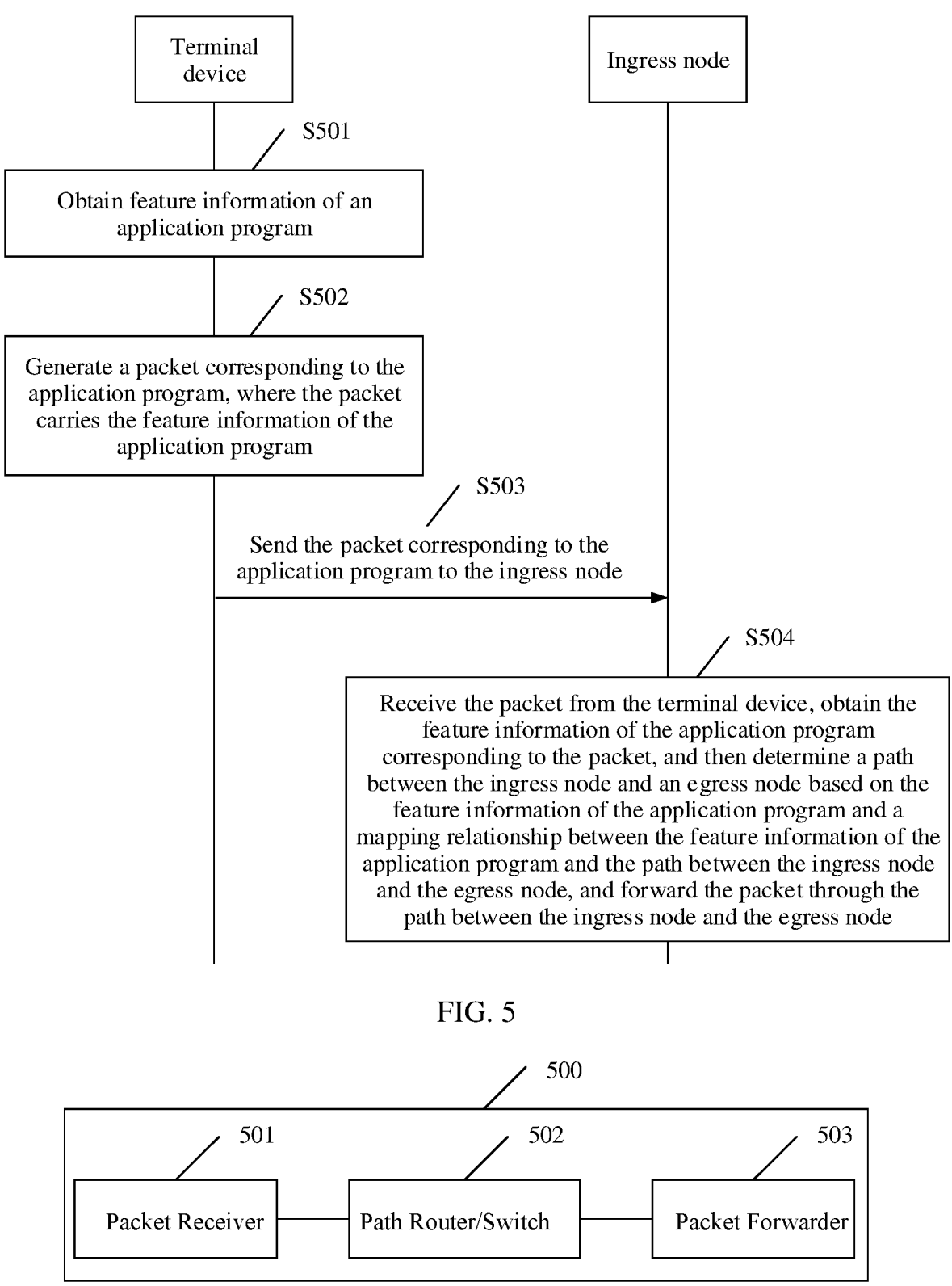
FIG. 5 is a schematic diagram of another packet processing method according to an embodiment of this application.
FIG. 6 is a structural block diagram of a packet processing apparatus according to an embodiment of this application.

FIG. 5 shows a packet processing method according to an embodiment of this application. The method may be applied to a network system, and the network system may include an ingress node and an egress node. The ingress node receives a packet from a terminal device, and the packet reaches a destination node through a path between the ingress node and the egress node. In this embodiment of this application, the ingress node may be the ingress node 102 or the ingress node 303, and the egress node may be the egress node 103 or the egress node 304.

The packet processing method may include the following steps.

S501: The terminal device obtains feature information of an application program.

In this embodiment of this application, the feature information of the application program includes at least one piece of the following information: identification information and network performance requirement information of the application program. The identification information is used to identify the application program. For related descriptions of the identification information of the application program and the network performance requirement information of the application program, refer to the foregoing descriptions. Details are not described herein again.

In this embodiment of this application, after the application program is installed on the terminal device, the identification information of the application program may be stored in the terminal device. Therefore, if the feature information of the application program includes the identification information of the application program, the terminal device may obtain the identification information of the application program based on a storage address of the identification information of the application program. The terminal device may obtain the network performance requirement information of the application program through configuration.

In addition, when a user logs in to the application program, a user identifier is usually required for login, and the user identifier may be stored in the terminal device. If feature information of the application program further includes the user identifier, the terminal device may obtain the user identifier based on a storage location of the user identifier in the terminal device.

S502: The terminal device generates the packet corresponding to the application program, where the packet carries the feature information of the application program.

The feature information of the application program is used by the ingress node to determine the path from the ingress node to the egress node, so as to forward the packet to the destination node.

In this embodiment of this application, if the packet generated by the terminal device is an IPv6 packet, the feature information of the application program may be carried in an IPv6 extension header or a destination address of the IPv6 packet. Specifically, the IPv6 extension header of the IPv6 packet includes at least one of the following: a TLV field in the IPv6 extension header and a segment identifier SID in a segment routing header SRH. The TLV field in the IPv6 extension header includes at least one of the following: a hop-by-hop option TLV field, a destination option TLV field, and a TLV field in the SRH. For related descriptions of these fields, refer to the foregoing descriptions. Details are not described herein again.

In addition, a format of a value in the TLV field in the IPv6 extension header may be a segment identifier format. For a specific reason, refer to the foregoing descriptions. Details are not described herein again.

S503: The terminal device sends the packet corresponding to the application program to the ingress node.

In this embodiment of this application, the terminal device may directly send the packet corresponding to the application program to the ingress node in the network system, or the terminal device may first send the packet to the network device, and then the network device transmits the packet to the ingress node, so that the ingress node transmits the packet corresponding to the application program to the destination node. The ingress node may be the ingress node 102 or the ingress node 303, and the network device may be the network device 302.

S504: The ingress node receives the packet from the terminal device, obtains the feature information of the application program corresponding to the packet, and then determines the path between the ingress node and the egress node based on the feature information of the application program and a mapping relationship between the feature information of the application program and the path between the ingress node and the egress node, and forwards the packet through the path between the ingress node and the egress node.

In addition, as mentioned above, in the packet processing method shown in FIG. 2, when the feature information of the application program is the network performance requirement information of the application program, the ingress node may first obtain the identification information of the application program based on the packet, and then determine, based on a pre-stored mapping relationship between the identification information and the network performance requirement information of the application program, the network performance requirement information that is of the application program and that corresponds to the identification information of the application program. It may be understood that, if the feature information that is of the application program corresponding to the packet and that is obtained by the ingress node is the identification information of the application program, and when the mapping relationship that is between the feature information of the application program and the path between the ingress node and the egress node and that is stored in the ingress node is the mapping relationship shown in Table 3, Table 4, or Table 5, the ingress node may obtain matched network performance requirement information of the application program by searching Table 1 based on the identification information that is of the application program and that is obtained from the packet, and then determine the corresponding path between the ingress node and the egress node according to Table 3, Table 4, or Table 5.

In this embodiment of this application, because the packet generated by the terminal device carries the feature information of the application program, and the feature information of the application program is used by the ingress node to determine the path from the ingress node to the egress node, so as to forward the packet to the destination node. It can be learned that compared with a conventional technical solution in which a path meeting a traffic requirement is matched based on quintuple information, in this embodiment of this application, a management granularity of a traffic scheduling solution based on an application program level is finer, and allocation rationality of network resources is improved.

Correspondingly, refer to FIG. 6. An embodiment of this application further provides a packet processing apparatus 500. The apparatus may be used in an ingress node in a network system, and the ingress node may implement a function of the ingress node 102 shown in FIG. 2 or a function of the ingress node 303 shown in FIG. 4. The network system further includes an egress node, and a packet reaches a destination node through a path between the ingress node and the egress node.

The packet processing apparatus includes a packet receiver 501, a path determiner (e.g., router or switch) 502, and a packet forwarder 503. The packet receiver 501 is configured to perform S202 in the embodiment shown in FIG. 2 or S404 in the embodiment shown in FIG. 4. The path determiner 502 and the packet forwarder 503 are configured to perform S203 in the embodiment shown in FIG. 2 or S405 in the embodiment shown in FIG. 4.

The packet receiver 501 is configured to receive the packet, and obtain feature information of an application program corresponding to the packet. The feature information of the application program includes at least one piece of the following information: identification information of the application program and network performance requirement information of the application program. The identification information is used to identify the application program, and the network performance requirement information of the application program is used to indicate a network performance requirement of the application program.

The path determiner 502 is configured to determine the path between the ingress node and the egress node based on the feature information of the application program and a mapping relationship between the feature information of the application program and the path between the ingress node and the egress node.

The packet forwarder 503 is configured to forward the packet through the path between the ingress node and the egress node.

The packet processing apparatus can implement the function of the ingress node 102 or the function of the ingress node 303 in the foregoing method embodiment. For specific execution steps, refer to the foregoing method embodiment. Details are not described herein again.

Figure 7:
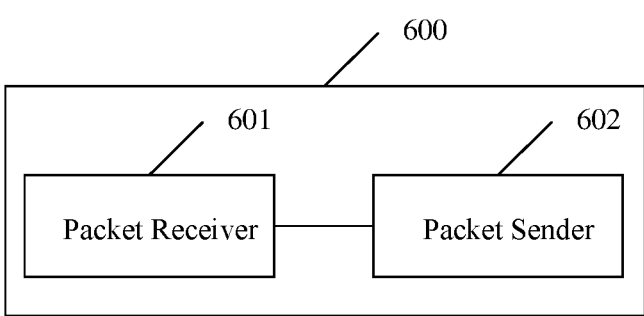
FIG. 7 is a structural block diagram of another packet processing apparatus according to an embodiment of this application.

Correspondingly, refer to FIG. 7. An embodiment of this application further provides a packet processing apparatus 600. The apparatus may be used in a network device in a network system, and the network device may implement a function of the network device 302 shown in FIG. 4. The network system further includes an ingress node and an egress node, and a packet reaches a destination node through a path between the ingress node and the egress node.

The packet processing apparatus includes a packet receiver 601 and a packet sender 602. The packet receiver 601 is configured to perform S402 in the embodiment shown in FIG. 4, and the packet sender 602 is configured to perform S403 in the embodiment shown in FIG. 4.

The packet receiver 601 is configured to receive the packet, and obtain feature information of an application program corresponding to the packet. The feature information of the application program includes at least one piece of the following information: identification information of the application program and network performance requirement information of the application program. The identification information is used to identify the application program, and the network performance requirement information of the application program is used to indicate a network performance requirement of the application program.

The packet sender 602 is configured to send the packet that carries the feature information of the application program to the ingress node.

The packet processing apparatus can implement the function of the network device 302 in the foregoing method embodiment. For specific execution steps, refer to the foregoing method embodiment. Details are not described herein again.

Figure 8:
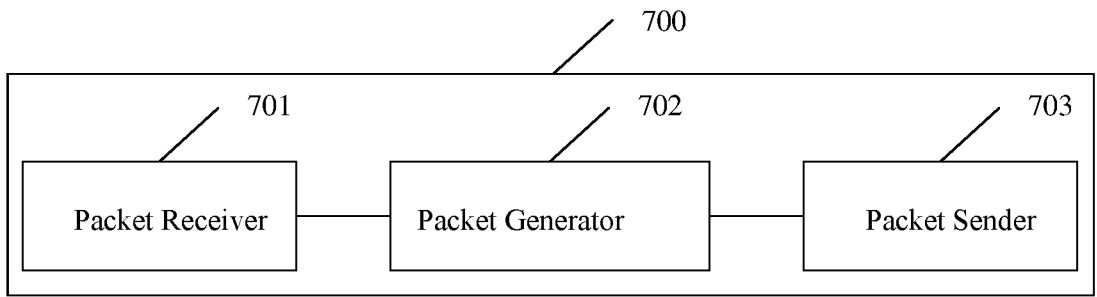
FIG. 8 is a structural block diagram of a packet sending apparatus according to an embodiment of this application.

Correspondingly, refer to FIG. 8. An embodiment of this application further provides a terminal device 700. The terminal device 700 may implement a function of the terminal device 101 shown in FIG. 2 or a function of the terminal device 301 shown in FIG. 4.

The terminal device 700 includes a packet receiver 701, a packet generator 702, and a packet sender 703. The packet receiver 701 is configured to perform S501 in the embodiment shown in FIG. 5, the packet generator 702 is configured to perform S502 in the embodiment shown in FIG. 5, and the packet sender 703 is configured to perform S503 in the embodiment shown in FIG. 5.

The packet receiver 701 is configured to obtain feature information of an application program. The feature information of the application program includes at least one piece of the following information: identification information of the application program and network performance requirement information of the application program. The identification information is used to identify the application program.

The packet generator 702 is configured to generate a packet corresponding to the application program. The packet carries the feature information of the application program, and the feature information of the application program is used by an ingress node to determine a path from the ingress node to an egress node, so as to forward the packet to a destination node.

The packet sender 703 is configured to send the packet corresponding to the application program to the destination node by using a network system.

The terminal device 700 can implement the function of the terminal device 101 or the function of the terminal device 301 in the foregoing method embodiment. For specific execution steps, refer to the foregoing method embodiment. Details are not described herein again.

Figure 9:
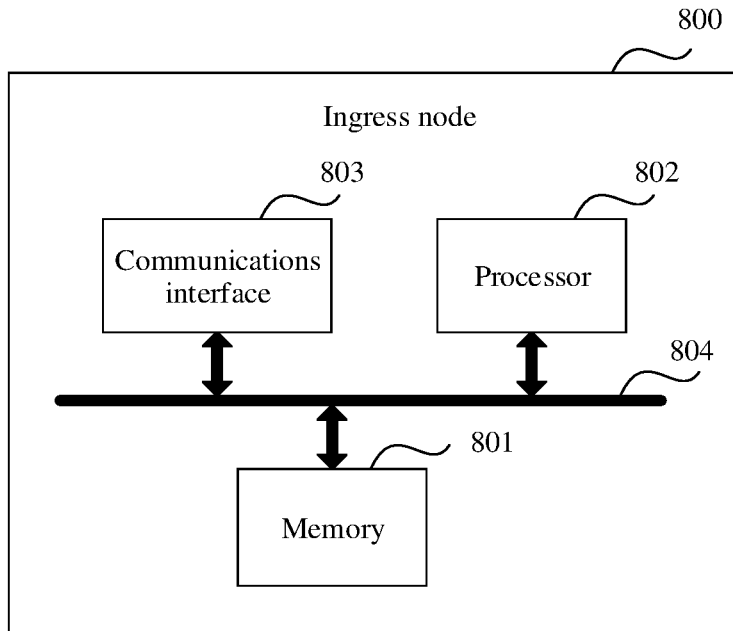
FIG. 9 is a diagram of a hardware architecture of an ingress node according to an embodiment of this application.

Referring to FIG. 9, an embodiment of this application provides an ingress node 800. The ingress node 800 may implement functions of the ingress node in the embodiments shown in FIG. 1 to FIG. 5. The ingress node includes a memory 801, a processor 802, and a communications interface 803.

The memory 801 is configured to store instructions. When the embodiment shown in FIG. 6 is implemented and the units described in the embodiment in FIG. 6 are implemented by using software, software or program code required for performing functions of the packet receiver 501, the path determiner 502, and the packet forwarder 503 in FIG. 6 is stored in the memory 801.

The processor 802 is configured to execute the instructions in the memory 801, to perform the packet processing method applied to the ingress node 102 in the embodiment shown in FIG. 2 or the ingress node 303 in the embodiment shown in FIG. 4.

The communications interface 803 is configured to perform communication.

The memory 801, the processor 802, and the communications interface 803 are mutually connected through a bus 804. The bus 804 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 9, but this does not mean that there is only one bus or only one type of bus.

In a specific embodiment, the processor 802 is configured to: obtain a packet and obtain feature information of an application program corresponding to the packet; and determine a path between the ingress node and an egress node based on the feature information of the application program and a mapping relationship between the feature information of the application program and the path between the ingress node and the egress node. The feature information of the application program includes at least one piece of the following information: identification information of the application program and network performance requirement information of the application program. The identification information is used to identify the application program. For a detailed processing process of the processor 802, refer to the detailed descriptions of S202 and S203 in the embodiment shown in FIG. 2 and the detailed descriptions of S404 and S405 in the embodiment shown in FIG. 4. Details are not described herein again.

The communications interface 803 is configured to forward the packet through the path between the ingress node and the egress node. For a specific process, refer to the detailed descriptions of S203 in the embodiment shown in FIG. 2 and the detailed descriptions of S405 in the embodiment shown in FIG. 4. Details are not described herein again.

Figure 10:
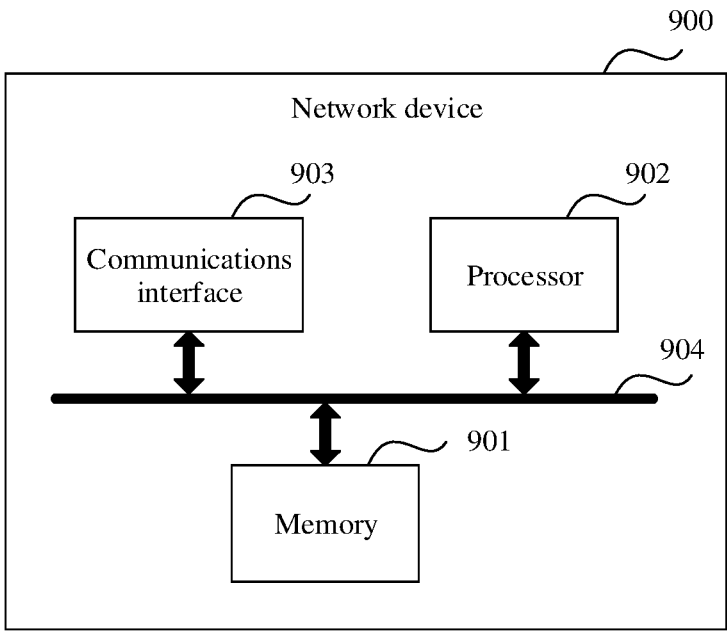
FIG. 10 is a diagram of a hardware architecture of a network device according to an embodiment of this application.

Referring to FIG. 10, an embodiment of this application provides a network device 900. The network device may implement functions of the network device in the embodiments shown in FIG. 4 and FIG. 5. The network device 900 includes a memory 901, a processor 902, and a communications interface 903.

The memory 901 is configured to store instructions. When the embodiment shown in FIG. 7 is implemented and the units described in the embodiment in FIG. 7 are implemented by using software, software or program code required for performing functions of the packet receiver 601 and the packet sender 602 in FIG. 7 is stored in the memory 901.

The processor 902 is configured to execute the instructions in the memory 901, to perform the packet processing method applied to the network device 302 in the embodiment shown in FIG. 4.

The communications interface 903 is configured to communicate with a terminal device and an ingress node.

The memory 901, the processor 902, and the communications interface 903 are mutually connected through a bus 904. The bus 904 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 10, but this does not mean that there is only one bus or only one type of bus.

In a specific embodiment, the processor 902 is configured to obtain a packet and obtain feature information of an application program corresponding to the packet. The feature information of the application program includes at least one piece of the following information: feature information and network performance requirement information of the application program. The identification information is used to identify the application program. For a detailed processing process of the processor 902, refer to the detailed descriptions of S402 and S403 in the embodiment shown in FIG. 4. Details are not described herein again.

The communications interface 903 is configured to send, to the ingress node, the packet that carries the feature information of the application program. The feature information of the application program is used by the ingress node to determine a path from the ingress node to an egress node, so as to forward the packet. For a specific process, refer to the detailed descriptions of S403 in the embodiment shown in FIG. 4. Details are not described herein again.

Figure 11:
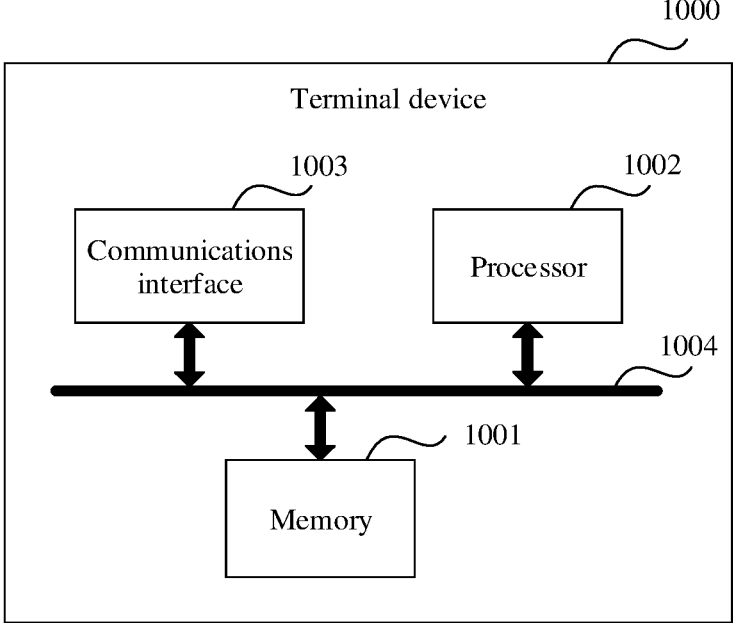
FIG. 11 is a diagram of a hardware architecture of a terminal device according to an embodiment of this application.

Referring to FIG. 11, an embodiment of this application provides a terminal device 1000. The terminal device may implement a function of the terminal device 101 in the embodiment shown in FIG. 2 or a function of the terminal device 301 in the embodiment shown in FIG. 4. The terminal device 1000 includes a memory 1001, a processor 1002, and a communications interface 1003.

The memory 1001 is configured to store instructions. When the embodiment shown in FIG. 8 is implemented and the units described in the embodiment in FIG. 8 are implemented by using software, software or program code required for performing functions of the obtaining unit 701, the packet generator 702, and the packet sender 703 in FIG. 8 is stored in the memory 1001.

The processor 1002 is configured to execute the instructions in the memory 1001, to perform the packet processing method applied to the network device 301 in the embodiment shown in FIG. 4.

The communications interface 1003 is configured to communicate with a network device or an ingress node.

The memory 1001, the processor 1002, and the communications interface 1003 are mutually connected through a bus 1004. The bus 1004 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 11, but this does not mean that there is only one bus or only one type of bus.

In a specific embodiment, the processor 1002 is configured to obtain feature information of an application program. The feature information of the application program includes at least one of the following information: identification information and network performance requirement information of the application program. The identification information is used to identify the application program. The terminal device 1000 generates a packet corresponding to the application program. The packet carries the feature information of the application program, and the feature information of the application program is used by the ingress node to determine a path from the ingress node to an egress node, so as to forward the packet to a destination node.

For a detailed processing process of the processor 1002, refer to the detailed descriptions of S501 and S502 in the embodiment shown in FIG. 5. Details are not described herein again.

The communications interface 1003 is used by the terminal device to send the packet corresponding to the application program to the destination node by using a network system. For a specific process, refer to the detailed descriptions of S503 in the embodiment shown in FIG. 5. Details are not described herein again.

Each of the memory 801, the memory 901, and the memory 1001 may be a random-access memory (random-access memory, RAM), a flash memory (flash memory), a read-only memory (read only memory, ROM), an erasable programmable read-only memory (erasable programmable read only memory, EPROM), an electrically erasable programmable read-only memory (electrically erasable programmable read only memory, EEPROM), a register (register), a hard disk, a removable hard disk, a CD-ROM, or any other form of storage medium known to a person skilled in the art.

Each of the processor 802, the processor 902, and the processor 1002 may be, for example, a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Each of the communications interface 803, the communications interface 903, and the communications interface 1003 may be, for example, an interface card, and may be an Ethernet (Ethernet) interface or an asynchronous transfer mode (asynchronous transfer mode, ATM) interface.

An embodiment of this application further provides a chip. The chip is disposed in an ingress node and used in a network system. The network system includes the ingress node and an egress node, and a packet reaches a destination node through a path between the ingress node and the egress node. The chip includes a processor and an interface circuit.

The interface circuit is configured to receive code instructions and transmit the code instructions to the processor.

The processor is configured to run the code instructions to perform the packet processing method applied to the ingress node 102 in the embodiment shown in FIG. 2 or the ingress node 303 in the embodiment shown in FIG. 4.

In a specific embodiment, the processor is configured to: obtain the packet and obtain feature information of an application program corresponding to the packet; and determine the path between the ingress node and the egress node based on the feature information of the application program and a mapping relationship between the feature information of the application program and the path between the ingress node and the egress node. The feature information of the application program includes at least one piece of the following information: identification information of the application program and network performance requirement information of the application program. The identification information is used to identify the application program. For a detailed processing process of the processor, refer to the detailed descriptions of S202 and S203 in the embodiment shown in FIG. 2 and the detailed descriptions of S404 and S405 in the embodiment shown in FIG. 4. Details are not described herein again.

An embodiment of this application further provides a chip. The chip is disposed in a network device and used in a network system. The network system includes the network device, an ingress node, and an egress node. A packet reaches a destination node through a path between the ingress node and the egress node. The chip includes a processor and an interface circuit.

The interface circuit is configured to receive code instructions and transmit the code instructions to the processor.

The processor is configured to run the code instructions to perform the packet processing method applied to the network device 302 in the embodiment shown in FIG. 4.

In a specific embodiment, the processor is configured to obtain the packet and obtain feature information of an application program corresponding to the packet. The feature information of the application program includes at least one piece of the following information: feature information and network performance requirement information of the application program. The identification information is used to identify the application program.

An embodiment of this application further provides a chip. The chip is disposed in a terminal device and used in a network system. The network system includes an ingress node and an egress node. The ingress node receives a packet from the terminal device, and the packet reaches a destination node through a path between the ingress node and the egress node. The chip includes a processor and an interface circuit.

The interface circuit is configured to receive code instructions and transmit the code instructions to the processor.

The processor is configured to run the code instructions to perform the packet processing method applied to the network device 301 in the embodiment shown in FIG. 4.

In a specific embodiment, the processor is configured to obtain feature information of an application program. The feature information of the application program includes at least one of the following information: identification information and network performance requirement information of the application program. The identification information is used to identify the application program. The terminal device generates the packet corresponding to the application program. The packet carries the feature information of the application program, and the feature information of the application program is used by the ingress node to determine the path from the ingress node to the egress node, so as to forward the packet to the destination node.

An embodiment of this application further provides a network system. The network system includes an ingress node and an egress node, and a packet reaches a destination node through a path between the ingress node and the egress node. The ingress node in the network system may perform the processing steps of the ingress node 102 in the embodiment shown in FIG. 2, or correspondingly, the ingress node in the network system is the packet processing apparatus 500 in the embodiment shown in FIG. 6.

An embodiment of this application further provides a network system. The network system includes a network device, an ingress node, and an egress node. A packet reaches a destination node through a path between the ingress node and the egress node. The network device in the network system may perform the processing steps of the network device 302 in the embodiment in FIG. 4, or correspondingly, the network device in the network system is the packet processing apparatus 600 in the embodiment shown in FIG. 7. The ingress node in the network system performs the processing steps of the ingress node 303 in the embodiment shown in FIG. 4.

Specifically, the ingress node is configured to: receive the packet sent by the network device; obtain feature information of an application program corresponding to the packet; determine the path between the ingress node and the egress node based on the feature information of the application program; and forward the packet through the path between the ingress node and the egress node.

An embodiment of this application further provides a network system. The network system includes a terminal device, an ingress node, and an egress node. A packet reaches a destination node through a path between the ingress node and the egress node. The terminal device in the network system may perform the processing steps of the terminal device in the embodiment in FIG. 5, or correspondingly, the terminal device in the network system is the terminal device 700 in the embodiment shown in FIG. 8. The ingress node in the network system performs the processing steps of the ingress node in the embodiment shown in FIG. 5.

Specifically, the ingress node is configured to: receive the packet sent by the network device; obtain feature information of an application program corresponding to the packet; determine the path between the ingress node and the egress node based on the feature information of the application program; and forward the packet through the path between the ingress node and the egress node.

An embodiment of this application further provides a computer-readable storage medium, including instructions. When the instructions are run on a computer, the computer is enabled to perform the packet processing method applied to the ingress node 800.

An embodiment of this application further provides a computer-readable storage medium, including instructions. When the instructions are run on a computer, the computer is enabled to perform the packet processing method applied to the network device 900.

An embodiment of this application further provides a computer-readable storage medium, including instructions. When the instructions are run on a computer, the computer is enabled to perform the packet processing method applied to the terminal device 1000.

In the specification, claims, and accompanying drawings of this application, the terms "first", "second", "third", "fourth", and the like (if existent) are intended to distinguish between similar objects, but do not necessarily indicate a specific order or sequence. It should be understood that the data termed in such a way is interchangeable in a proper circumstance, so that the embodiments described herein can be implemented in other orders than the order illustrated or described herein. In addition, the terms "include", "contain" and any other variants mean to cover the non-exclusive inclusion. For example, a process, method, system, product, or device that includes a list of steps or units is not necessarily limited to the steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical service division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a computer software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM, Read-Only Memory), a random-access memory (RAM, Random Access Memory), a magnetic disk, or an optical disc.

A person skilled in the art should be aware that in the foregoing one or more examples, services described in the present invention may be implemented by hardware, software, firmware, or any combination thereof. When the services described in the present invention are implemented by software, the foregoing services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or special-purpose computer.

In the foregoing specific implementations, the objectives, technical solutions, and benefits of the present invention are further described in detail. It should be understood that the foregoing descriptions are merely specific implementations of the present invention.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A packet processing method, applied to an ingress node in a network system, the network system further comprising an egress node, a packet reaching a destination node through a path between the ingress node and the egress node, the method comprising:

obtaining the packet by the ingress node;

obtaining feature information of an application program corresponding to the packet obtained by the ingress node, wherein the feature information of the application program comprises at least the following information: identification information and network performance requirement information of the application program, the identification information being used to identify the application program;

determining, by the ingress node, the path between the ingress node and the egress node based on the feature information of the application program and a mapping relationship between the feature information of the application program and the path between the ingress node and the egress node; and forwarding, by the ingress node, the packet through the path between the ingress node and the egress node.

2. The method according to claim 1, wherein the packet is an internet protocol version 6 IPv6 packet, and the feature information of the application program is carried in an IPV6 extension header or a destination address of the IPV6 packet.

3. The method according to claim 2, wherein the IPV6 extension header of the IPV6 packet comprises at least one of the following:

a type-length-value TLV field in the IPV6 extension header and a segment identifier SID in a segment routing header SRH.

4. The method according to claim 3, wherein the TLV field in the IPV6 extension header comprises at least one of the following:

a hop-by-hop option TLV field, a destination option TLV field, and a TLV field in the SRH.

5. The method according to claim 3, wherein a format of a value in the TLV field in the IPV6 extension header is a segment identifier format.

6. The method according to claim 1, wherein the feature information of the application program is carried in the packet; and obtaining feature information of an application program corresponding to the packet comprises:

extracting, from the packet, the feature information of the application program corresponding to the packet.

7. The method according to claim 1, wherein obtaining feature information of an application program corresponding to the packet comprises:

parsing the packet to obtain the feature information of the application program corresponding to the packet.

8. The method according to claim 1, wherein the packet carries service information corresponding to the application program, the service information comprises information about a service to which the application program belongs, and obtaining feature information of an application program corresponding to the packet comprises:

determining, based on the service information, the feature information of the application program corresponding to the packet.

9. The method according to claim 1, wherein the feature information of the application program comprises network performance requirement information of the application program, and the ingress node obtains the network performance requirement information of the application program by:

obtaining the identification information of the application program based on the packet; and determining the network performance requirement information of the application program based on the identification information.

10. The method according to claim 1, wherein the feature information of the application program further comprises a user identifier corresponding to the application program, the user identifier being used to identify a user corresponding to the application program.

11. The method according to claim 1, wherein the path between the ingress node and the egress node comprises a tunnel or segment routing SR policy.

12. The method according to claim 1, wherein the network performance requirement information of the application program comprises at least one of the following:

bandwidth information, latency information, latency jitter information, packet loss information, reliability information, and security information.

13. A packet processing method applied to a network device in a network system, the network system further comprising an ingress node, and an egress node, a packet reaching a destination node through a path between the ingress node and the egress node, the method comprising:

obtaining the packet by the network device;

obtaining feature information of an application program corresponding to the obtained packet, wherein the feature information of the application program comprises at least the following information: identification information and network performance requirement information of the application program, the identification information being used to identify the application program; and sending, by the network device, the obtained packet to the ingress node, wherein the feature information of the application program is used by the ingress node to determine the path from the ingress node to the egress node.

14. The method according to claim 13, wherein the packet is an internet protocol version 6 IPv6 packet, and the feature information of the application program is carried in an IPV6 extension header or a destination address of the IPV6 packet sent by the network device to the ingress node.

15. The method according to claim 14, wherein the IPV6 extension header of the IPV6 packet comprises at least one of the following:

a type-length-value TLV field in the IPV6 extension header and/or a segment identifier SID in a segment routing header SRH.

16. The method according to claim 15, wherein the TLV field in the IPV6 extension header comprises at least one of the following:

a hop-by-hop option TLV field, a destination option TLV field, and a TLV field in the SRH.

17. The method according to claim 15, wherein a format of a value in the TLV field in the IPV6 extension header is a segment identifier format.

18. The method according to claim 14, wherein conditioned on a TLV field in the IPV6 extension header of the IPV6 packet obtained by the network device carrying the feature information of the application program in a segment identifier format:

obtaining, by the network device, feature information of an application program corresponding to the packet comprises: extracting, by the network device, the feature information of the application program from the TLV field in the IPV6 extension header; and sending, by the network device, the packet that carries the feature information of the application program to the ingress node comprises: sending, by the network device, the destination address that is of the IPV6 packet and that carries the feature information of the application program to the ingress node.

19. An ingress node for use in a network system comprising the ingress node and an egress node, a packet reaching a destination node through a path between the ingress node and the egress node, the ingress node comprising:

a memory configured to store instructions; and a processor configured to execute the instructions in the memory, to cause the ingress node to perform operations comprising:

obtain the packet, and obtain feature information of an application program corresponding to the packet, wherein the feature information of the application program comprises at least the following information: identification information and network performance requirement information of the application program, the identification information being used to identify the application program;

determine the path between the ingress node and the egress node based on the feature information of the application program and a mapping relationship between the feature information of the application program and the path between the ingress node and the egress node; and forward the packet through the path between the ingress node and the egress node.

20. A network device for use in a network system comprising the network device, an ingress node, and an egress node, a packet reaching a destination node through a path between the ingress node and the egress node, the network device comprising:

a memory is configured to store instructions; and a processor is configured to execute the instructions in the memory, to cause the network device to perform operations comprising:

obtain the packet;

obtain feature information of an application program corresponding to the packet, wherein the feature information of the application program comprises at least the following information: identification information and network performance requirement information of the application program, the identification information being used to identify the application program; and send the packet that carries the feature information of the application program to the ingress node, wherein the feature information of the application program is used by the ingress node to determine the path from the ingress node to the egress node.

\* \* \* \* \*